United States Patent
Rasmussen et al.

(10) Patent No.: US 7,142,950 B2
(45) Date of Patent: Nov. 28, 2006

(54) METHODS AND APPARATUS FOR PROVIDING AND DISTRIBUTING STANDBY POWER

(75) Inventors: Neil Rasmussen, Concord, MA (US); William Ziegler, Reading, MA (US); David A. Colucci, Stoneham, MA (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

(21) Appl. No.: 10/856,741

(22) Filed: May 28, 2004

(65) Prior Publication Data

US 2005/0278075 A1   Dec. 15, 2005

(51) Int. Cl.
   *H02J 7/00*   (2006.01)
(52) U.S. Cl. .............. 700/286; 700/297; 361/193; 307/7; 307/70; 307/73; 307/76
(58) Field of Classification Search ............... 700/286, 700/297; 361/193; 307/70, 73, 7, 76
See application file for complete search history.

(56) References Cited

U.S. PATENT DOCUMENTS

| | | | | |
|---|---|---|---|---|
| 3,705,280 A | * | 12/1972 | Harms | 200/50.33 |
| 4,231,029 A | | 10/1980 | Johnston | |
| 4,611,289 A | | 9/1986 | Coppola | |
| 4,769,555 A | | 9/1988 | Pequet et al. | |
| 5,081,367 A | * | 1/1992 | Smith et al. | 307/64 |
| 5,534,734 A | | 7/1996 | Pugh et al. | |
| 5,646,459 A | * | 7/1997 | Hatate et al. | 307/85 |
| 5,939,802 A | | 8/1999 | Hornbeck | |
| 6,011,327 A | * | 1/2000 | Cook et al. | 307/125 |
| 6,172,428 B1 | * | 1/2001 | Jordan | 290/40 C |
| 6,172,432 B1 | | 1/2001 | Schnackenberg et al. | |
| 6,330,176 B1 | * | 12/2001 | Thrap et al. | 363/142 |
| 6,570,269 B1 | | 5/2003 | McMillan et al. | |
| 6,721,672 B1 | | 4/2004 | Spitaels et al. | |

(Continued)

FOREIGN PATENT DOCUMENTS

GB   516 265   12/1939

OTHER PUBLICATIONS

MGE UPS Systems Brochure, "Galaxy 3000—Data Center Grade Power Protection for Critical Environments," Dec. 2001, 4 pps.

(Continued)

*Primary Examiner*—Albert W. Paladini
*Assistant Examiner*—Michael D. Masinick
(74) *Attorney, Agent, or Firm*—Lowrie, Lando & Anastasi, LLP

(57) ABSTRACT

Aspects of the invention are directed to power distribution systems and methods for distributing power from a primary power source and a backup power source to a load. In one particular aspect, a power distribution system includes a first input to receive input power from the primary power source, a second input to receive input power from the backup power source, an output that provides output power from at least one of the primary power source and the backup power source, a first switch operatively coupled to the first input and the output and operative to selectively couple the first input to the output, a second switch operatively coupled to the second input and the output and operative to selectively couple the second input to the output, and a controller operatively coupled to the first switch and to the second switch and configured to control the first switch and the second switch to provide an electrical interlock.

49 Claims, 13 Drawing Sheets

U.S. PATENT DOCUMENTS

| | | |
|---|---|---|
| 6,741,442 B1 | 5/2004 | McNally et al. |
| 6,825,578 B1 * | 11/2004 | Perttu .......................... 307/70 |
| 2002/0130556 A1 | 9/2002 | Hohri |
| 2002/0134567 A1 | 9/2002 | Rasmussen et al. |
| 2003/0034693 A1 * | 2/2003 | Wareham et al. ............. 307/23 |
| 2003/0048004 A1 | 3/2003 | Fleming et al. |
| 2003/0048005 A1 * | 3/2003 | Goldin et al. ................. 307/64 |
| 2003/0062775 A1 | 4/2003 | Sinha |
| 2003/0072977 A1 | 4/2003 | Speranza et al. |
| 2003/0111842 A1 | 6/2003 | Gilbreth et al. |
| 2004/0169972 A1 | 9/2004 | Goss |

OTHER PUBLICATIONS

MGE UPS Systems Brochure, "Galaxy PW—Next Generation Critical Power Protection System," Jun. 2002, 2 pps.

Cutler-Hammer, "Switchboards Integrated Facility Switchboards," Jan. 2003, vol. 1, Ref. No. (0893), 1 pp.

APC User's Guide Brochure, "InfraStruXure Manager," Mar. 2004, 181 pps.

Partial International Search for PCT/US2005/018469 mailed Sep. 2, 2005.

* cited by examiner

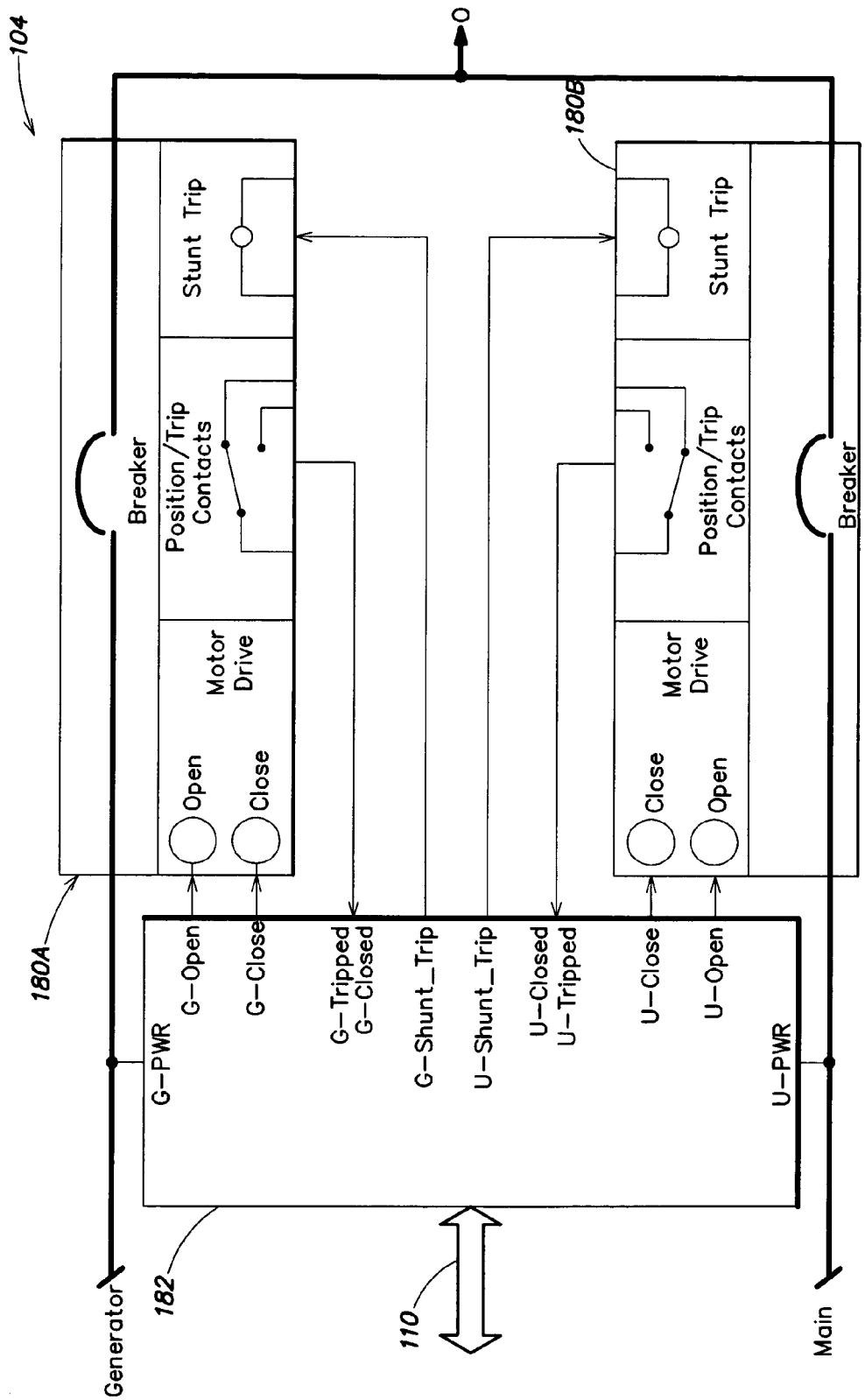

METHODS AND APPARATUS FOR PROVIDING AND DISTRIBUTING STANDBY POWER

BACKGROUND OF INVENTION

1. Field of Invention

Embodiments of the invention relate generally to methods and apparatus for providing uninterruptible power to sensitive and/or critical loads. More specifically, embodiments of the invention relate to distribution and control systems for power systems having backup power sources.

2. Discussion of Related Art

The use of uninterruptible power supplies (UPSs) and backup power sources, such as generators, to provide uninterrupted power to critical loads is well known. Typically, UPSs use batteries to provide uninterrupted power during relatively brief power outages, while backup generators are used to provide power during longer power outages. Typically, a UPS is used to provide power for outages less than thirty minutes, but depending on the power draw of a load, and the capacity of batteries used in a UPS, the actual runtime of a UPS may be greater or less than thirty minutes. When longer runtime than that provided by a UPS is required, a generator may be used. When generators are used, a UPS may still be used to provide power during short outages and to provide continuous power during the period of time required to start a generator and bring it on line after an outage has occurred.

The installation of a generator in a facility power system is typically an expensive ordeal requiring the hiring of an engineering firm along with several subcontractors to design and install the associated control and switching systems needed to integrate the generator into the facility power system. As a result, each system is a unique system that requires substantial labor in the field in an uncontrolled environment. Control systems are often designed into facility power systems, however, because different components of the systems may be supplied by different manufacturers, these control systems often use different communication protocols making communication among the components difficult, if possible at all.

In typical installations that employ a generator, a transfer switch is used to transfer a source of power for the installation between a primary source (utility) and a back-up source (generator). The transfer switches typically are implemented using a single device having a mechanical interlock that prevents power from being simultaneously supplied from both the primary source and the back-up source. One problem with these switches is that they represent a single point of failure in the system. Upon certain failure conditions of such transfer switches, since the switch is implemented using a single device, the switch is not able to provide power from either the primary source or the back-up source. In critical facilities, such failures are unacceptable. Another problem with these switches is that the mechanical interlock typically prevents simultaneous power from being supplied by both the generator and the utility, resulting in a brief power outage when utility power returns and the supply of power is switched from generator to utility.

SUMMARY OF INVENTION

At least one embodiment of the invention provides improvements to backup power systems, such as those described above.

A first aspect of the invention is directed to a power distribution system for distributing power from a primary power source and a backup power source to a load. The power distribution system includes a first input to receive input power from the primary power source, a second input to receive input power from the backup power source, an output that provides output power from at least one of the primary power source and the backup power source, a first switch operatively coupled to the first input and the output and operative to selectively couple the first input to the output, a second switch operatively coupled to the second input and the output and operative to selectively couple the second input to the output, and a controller operatively coupled to the first switch and to the second switch and configured to control the first switch and the second switch to provide an electrical interlock.

In the power distribution system of the first aspect, each of the first switch and the second switch may have an open position and a closed position, wherein the controller is configured to control the first switch to switch from the closed position to the open position, if the second switch is switched from the open position to the closed position. The controller may be configured to control the first switch to switch from the closed position to the open position a predetermined period of time after the second switch is switched from the open position to the closed position. The primary power source may provide voltage having a voltage waveform with a first voltage level and a first frequency, and the backup power source may provide voltage having a voltage waveform with a second voltage level and a second frequency, wherein the second frequency is different from the first frequency, and wherein the controller may be configured to change a source of output power for the power distribution system when the first voltage level is approximately equal to the second voltage level. The controller may be further configured to change the source of output power for the system when both the first voltage level and the second voltage level are approximately zero. The power distribution system may further include an input to receive an emergency power off signal, and the controller may be configured to switch both the first switch and the second switch to an open position upon receipt of the emergency power off signal. The backup power source may be a generator, and the power distribution system may be configured to receive a DC voltage from a battery of the generator, and power for the controller may be derived from the DC voltage from the battery. The controller may be configured to receive data related to operational status of the generator and to control the first switch and the second switch based on the data. The data related to operational status of the generator may include a fuel level of the generator, and the controller may be configured to determine a run time of the generator based on the fuel level. The controller may be configured to receive UPS data related to operational status of at least one uninterruptible power supply and to control the first switch and the second switch based on the UPS data. The backup power source may be a generator, and the output may include a plurality of outputs, at least one of which is configured to provide power to the generator.

A second aspect of the invention is directed to a power distribution system for distributing power from a primary power source and a backup power source to a load. The power distribution system includes an enclosure having at least one input to receive input power from a primary source and to receive input power from a backup source, and at least one output to provide output power, a first controlled switch mounted in the enclosure and configured to receive power from the primary source, a second controlled switch mounted in the enclosure and configured to receive power from the secondary source, and a controller mounted in the enclosure and coupled to the first controlled switch and the second controlled switch to provide power to the output from at least one of the first controlled switch and the second controlled switch.

The power distribution system may further include a plurality of circuit breakers mounted in the enclosure and operatively coupled between the first controlled switch and the second controlled switch and the at least one output, and may also include a plurality of bus bars bolted to each of the first controlled switch and the second controlled switch. The system may further include a user interface device coupled to the controller. The enclosure may include a front door, and the user interface device may be mounted in the enclosure and accessible through an opening in the front door of the enclosure. The enclosure may include an inner panel, accessible with the front door in an open position, having at least one opening to allow access to the first controlled switch and the second controlled switch. The user interface device may be mounted to the inner panel. The controller may be configured to control the first switch and the second switch to provide an electrical interlock. The enclosure may have an input to receive a DC voltage from a generator, and the controller may be configured to be powered from the DC voltage. The system may further include a removable panel coupled to the enclosure, wherein the first controlled switch and the second controlled switch are mounted to the panel. The removable panel may have a handle mounted to a top section of the removable panel, and a pair of wheels mounted to a bottom section of the removable panel.

Yet another aspect of the invention is directed to a system for providing control of power to a plurality of devices in a facility. The system includes a facility controller, a power distribution device having a first input to receive power from a utility power source, a second input to receive power from a backup power source and an output that provides power from at least one of the utility power source and the backup power source, and an uninterruptible power supply coupled to the output of the power distribution device and configured to provide output power derived from one of the utility power source, the backup power source, and a battery power source. The facility controller is configured to receive operational data related to status of the utility power source, the backup power source, and the uninterruptible power supply, and to control distribution of power to the plurality of devices based on the operational data received.

The system may further include a controllable power switch operatively coupled to the facility controller and to the output of the power distribution device, and the controllable power switch may include a plurality of power outlets that are controlled based on signals from the facility controller to implement power shedding based on a detection of a loss of utility power. At least one of the plurality of devices may be an air conditioning unit, and the facility controller may be configured to detect a temperature in the facility and control the air conditioning unit based on the temperature detected and an operational state of the utility power and the backup power source. The backup power source may be a generator, and the power distribution device may include a controller configured to communicate status of the generator and the utility power to the facility controller. The controller of the power distribution device may be configured to determine remaining run time of the generator and communicate data regarding the remaining run time to the facility controller. The power distribution device may further include a first switch operatively coupled to the first input and the output and operative to selectively couple the first input to the output, and a second switch operatively coupled to the second input and the output and operative to selectively couple the second input to the output, and the controller of the power distribution device may be operatively coupled to the first switch and to the second switch and configured to control the first switch and the second switch to provide an electrical interlock. Each of the first switch and the second switch may have an open position and a closed position, and the controller of the power distribution device may be configured to control the first switch to switch from the closed position to the open position, if the second switch is switched from the open position to the closed position. The controller of the power distribution device may also be configured to control the first switch to switch from the closed position to the open position a predetermined period of time after the second switch is switched from the open position to the closed position.

Another aspect of the invention is directed to a method for distributing power from a utility power source and a generator to a load. The method includes receiving input power at a first switch from the utility power source, providing power to the load from the first switch, receiving input power at a second switch from the generator, controlling the first switch and the second switch to implement an interlock scheme to limit the application of power at the load from both the utility power source and the generator.

The method may further include controlling the first switch to switch from a closed position to an open position, if the second switch is switched from an open position to a closed position, and may also include controlling the first switch to switch from a closed position to an open position a predetermined period of time after the second switch is switched from an open position to a closed position. The utility power source may provide voltage having a voltage waveform with a first voltage level and a first frequency, and the generator may provide voltage having a voltage waveform with a second voltage level and a second frequency, wherein the second frequency is different from the first frequency, and the method may further include changing a source of output power for the load when the first voltage level is approximately equal to the second voltage level. The method may further include changing the source of output power for the load when both the first voltage level and the second voltage level are approximately zero. The method may further include receiving an emergency power off signal, and switching both the first switch and the second switch to an open position upon receipt of the emergency power off signal. The method may also include receiving a DC voltage from a battery of the generator, and powering a controller for the first switch and the second switch from the DC voltage from the battery. The method can still further include receiving data related to operational status of the generator and controlling the first switch and the second switch based on the data. The data related to operational status of the generator may include a fuel level of the generator, and the method may further include determining a run time of the generator based on the fuel level. The method may further include receiving UPS data related to operational status of at least one uninterruptible power supply and controlling the first switch and the second switch based on the UPS data. The method may further include providing power to charge a battery of the generator from an output of one of the first switch and the second switch.

Yet another aspect of the invention is directed to a system for distributing power from a utility power source and a generator to a load. The system includes a first switch to receive power from the utility power source and selectively provide the received power to the load, a second switch to receive power from the generator and selectively provide the received power to the load, and means for controlling the first switch and the second switch to implement an interlock scheme to limit the application of power at the load from both the utility power source and the generator.

The system can further include means for controlling the first switch to switch from a closed position to an open position, if the second switch is switched from an open position to a closed position, and may include means for controlling the first switch to switch from a closed position to an open position a predetermined period of time after the second switch is switched from an open position to a closed position. The utility power source may provide voltage having a voltage waveform with a first voltage level and a first frequency, and the generator may provide voltage having a voltage waveform with a second voltage level and a second frequency, wherein the second frequency is different from the first frequency, and the system may further include means for changing a source of output power for the load when the first voltage level is approximately equal to the second voltage level. The system may further include means for changing the source of output power for the load when both the first voltage level and the second voltage level are approximately zero, and means for receiving an emergency power off signal and for switching both the first switch and the second switch to an open position upon receipt of the emergency power off signal. The system may still further include means for receiving a DC voltage from a battery of the generator and for powering a controller for the first switch and the second switch from the DC voltage from the battery. The system may include means for receiving data related to operational status of the generator and for controlling the first switch and the second switch based on the data. The data related to operational status of the generator may include a fuel level of the generator, and the system may further include means for determining a run time of the generator based on the fuel level. The system may include means for receiving UPS data related to operational status of at least one uninterruptible power supply and for controlling the first switch and the second switch based on the UPS data, and the system may include means for providing power to charge a battery of the generator from an output of one of the first switch and the second switch.

Yet another aspect of the invention is directed to a method for providing control of power to a plurality of devices in a facility from at least one of a utility power source and a generator, wherein at least one of the plurality of devices is coupled to an uninterruptible power supply. The method includes receiving operational data related to status of the utility power source, the backup power source, and the uninterruptible power supply, and controlling distribution of power to the plurality of devices based on the operational data received.

The method may further include controlling a controllable power switch to implement power shedding based on a detection of a loss of utility power. At least one of the plurality of devices may be an air conditioning unit, and the method may further include detecting a temperature in the facility and controlling the air conditioning unit based on the temperature detected and an operational state of the utility power and the generator. The method may include determining remaining run time of the generator. The method may further include implementing an interlock scheme to limit the application of power at the plurality of devices from both the utility power source and the generator. In the method, implementing an interlock scheme may include allowing application of power at the plurality of devices from both the utility power source and the generator for a predetermined period of time.

Still another aspect of the invention is directed to a power distribution system for distributing power from at least one power source to at least one load. The power distribution system includes an enclosure having at least one input to receive input power and at least one output to provide output power, the enclosure having an interior section having an interior wall, a removable panel mounted on the back wall of the enclosure, the removable panel having a top section and a bottom section with a handle coupled to the top section and a pair of wheels coupled to the bottom section, and a plurality of electrical power distribution components mounted to the panel and coupled to the at least one input and the at least one output.

In the system, the plurality of electrical power distribution components may include a first controlled switch configured to receive power from a first power source, a second controlled switch configured to receive power from a secondary source, and a controller coupled to the first controlled switch and the second controlled switch to provide output power from at least one of the first controlled switch and the second controlled switch. The handle may be removably coupled to the panel and the pair of wheels may be removably coupled to the panel.

Another aspect of the invention is directed to a method of installing a power distribution system in a facility. The method includes mounting an electronic enclosure to a wall in the facility, installing power distribution cables in the enclosure, at least one of the power distribution cables being coupled to a primary source of power, and at least one of the power distribution cables being coupled to a secondary source of power, and installing a panel having electronic components in the electronic enclosure by rolling the panel into the enclosure, wherein the panel includes a plurality of electronic components and at least one wheel.

The method may include aligning the panel with mounting hardware in the enclosure and mounting the panel, including the at least one wheel, to a back wall of the enclosure, and the method may further include electrically coupling the power distribution cables to the panel. The method may still further include selecting one of the primary source of power and the secondary source of power as an output power source for the power distribution system.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings:

FIG. 3 shows a functional block diagram of a transfer switch used in the system of FIG. 1;

DETAILED DESCRIPTION

Figure 1:
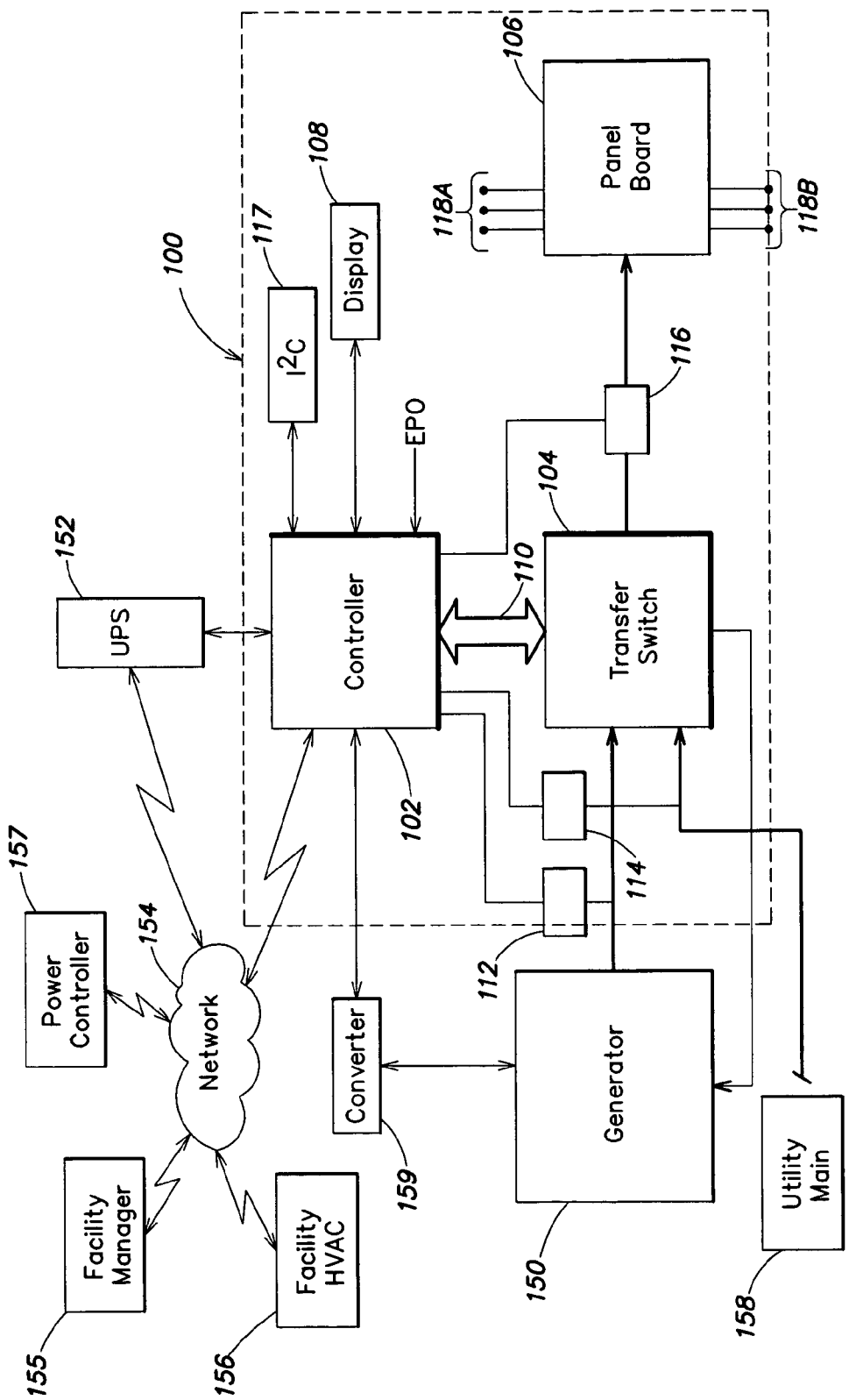
FIG. 1 shows a functional block diagram of a power distribution system of one embodiment of the present invention.

This invention is not limited in its application to the details of construction and the arrangement of components set forth in the following description or illustrated in the drawings. The invention is capable of other embodiments and examples and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

A system in accordance with one embodiment of the invention for providing, monitoring and distributing power will now be described with reference to FIG. 1, which shows a functional block diagram of a system 100. The system 100 includes a controller 102, a transfer switch 104, a panel board 106, a display 108, a distribution bus 110, an I²C bus 117 and sensors 112, 114 and 116. The system 100 controls, monitors and distributes power from a generator 150 and a utility main 158.

As shown in FIG. 1, the system 100 may be coupled to external devices including the generator 150, the utility main 158, an uninterruptible power supply (UPS) 152, a facility manager/controller 155, a power controller 157, and facility HVAC equipment 156. The system 100 may couple to the external devices either directly or through a network such as network 154. In one embodiment, the controller 102 receives data from a number of sources and based on the data controls the transfer switch 104 to provide power from the utility main and/or the generator to the panel board 106 which distributes output power to branch circuits 118A and 118B to provide power to equipment installed in a facility such as a data center.

The system 100 may operate with a number of different controllable generators such as Cummins Power Generation Gensets, available from Cummins of Columbus, Ind. Depending on the particular application, the system 100 may be configured to operate with different input voltages and may be configured as a single phase or a three phase system. As shown in FIG. 1, the generator 150 may be coupled to the controller 102 of the system 100 through a data converter 159 to communicate with the generator to receive status information from the generator and provide control signals to the generator. The data converter 159 is used as a data format converter to allow different generators to operate with the system 100. In one embodiment, used with a Cummins generator, the generator is configured to communicate using the Lonworks protocol and associated devices, available from Echelon Corporation of Palo Alto, Calif. In this embodiment, the data converter is used to convert the data from the Lonworks protocol to MODBUS over RS-232, and the converter may be implemented using an MMI-402 converter available from Control Solutions, Inc. of White Bear Lake, Minn.

The system 100 may also operate with and communicate with a number of different UPS systems, HVAC systems and other facility control systems. In the system of FIG. 1, the system 100 is shown coupled to a UPS 152 and HVAC equipment 158 through a network 154. In embodiments of the invention, the network 154 may be the internet, a local intranet or any other network system. In addition, the UPS 152 and the HVAC equipment may be coupled directly to the system 100 without the use of a network.

As discussed below in greater detail, in one embodiment, the controller of the system 100, in addition to providing control of the components of the system 100 may in some embodiments be used to control external devices such as uninterruptible power supplies, HVAC equipment, and power controllers to provide coordinated, centralized control of power to maximize power availability to all equipment. In another embodiment, the controller of the system 100 communicates with a facility manager/controller 155 to provide the facility manager/controller with operational information regarding utility power and generator power, to provide coordinated control and monitoring of a facility. In addition, the facility manager/controller and/or the system 100 can communicate with a power controller 157 that can be used to interrupt power to specific devices to institute power strategies, such as power shedding when necessary in the facility. While embodiments of the present invention may operate with several different external devices, in one embodiment, the system 100 is designed to operate with devices in the Infrastruxure™ family of products available from American Power Conversion (APC) Corporation of West Kingston, R.I. In one such embodiment, the facility manger/controller 155 may be implemented using a server computer running the Infrastucture Manager Software available from APC, and the power controller 157 may be implemented using one of the MasterSwitch™ power switches also available from APC.

Figure 2:
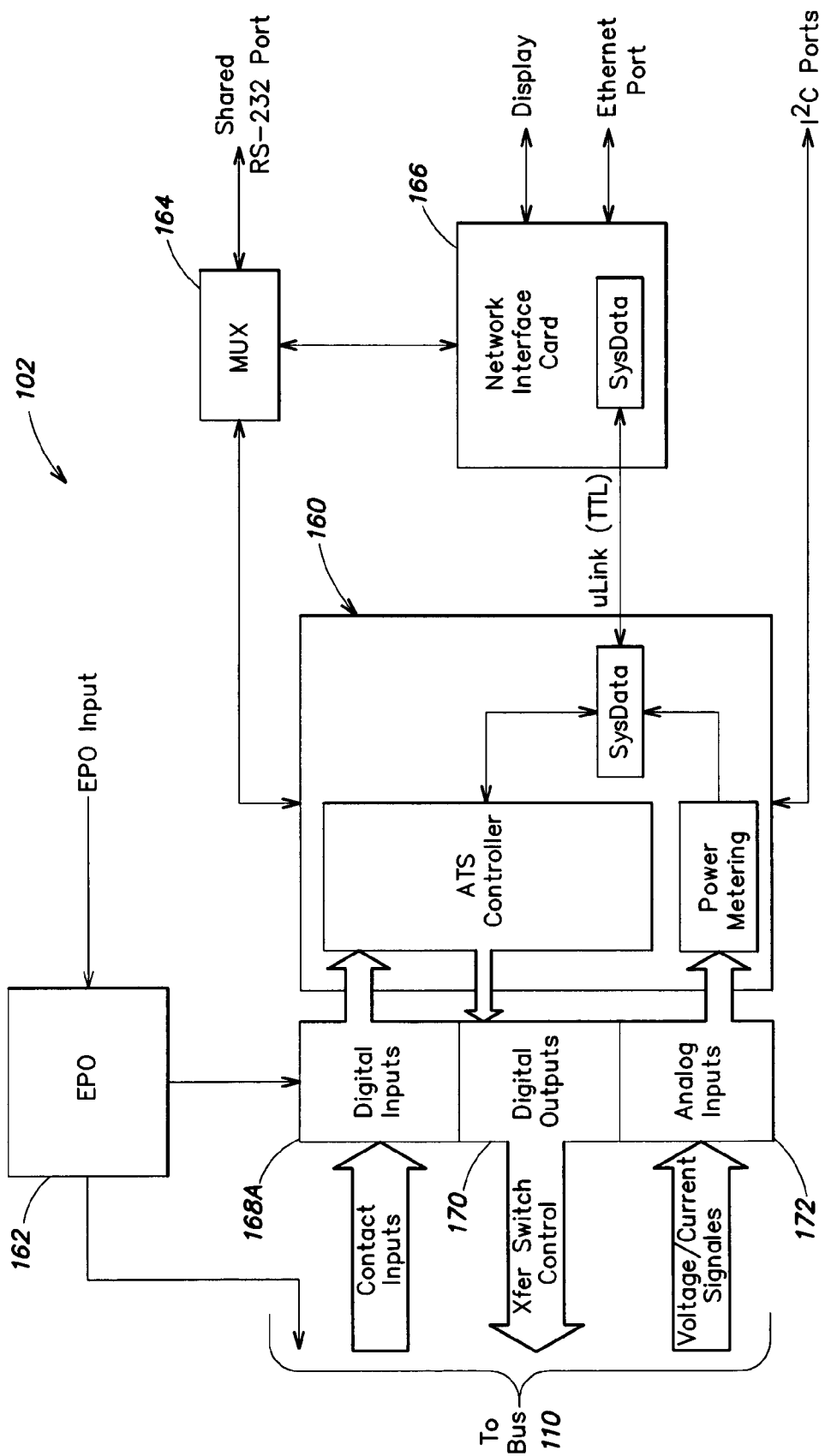
FIG. 2 shows a functional block diagram of a controller used in the system of FIG. 1.
Figure 4A:
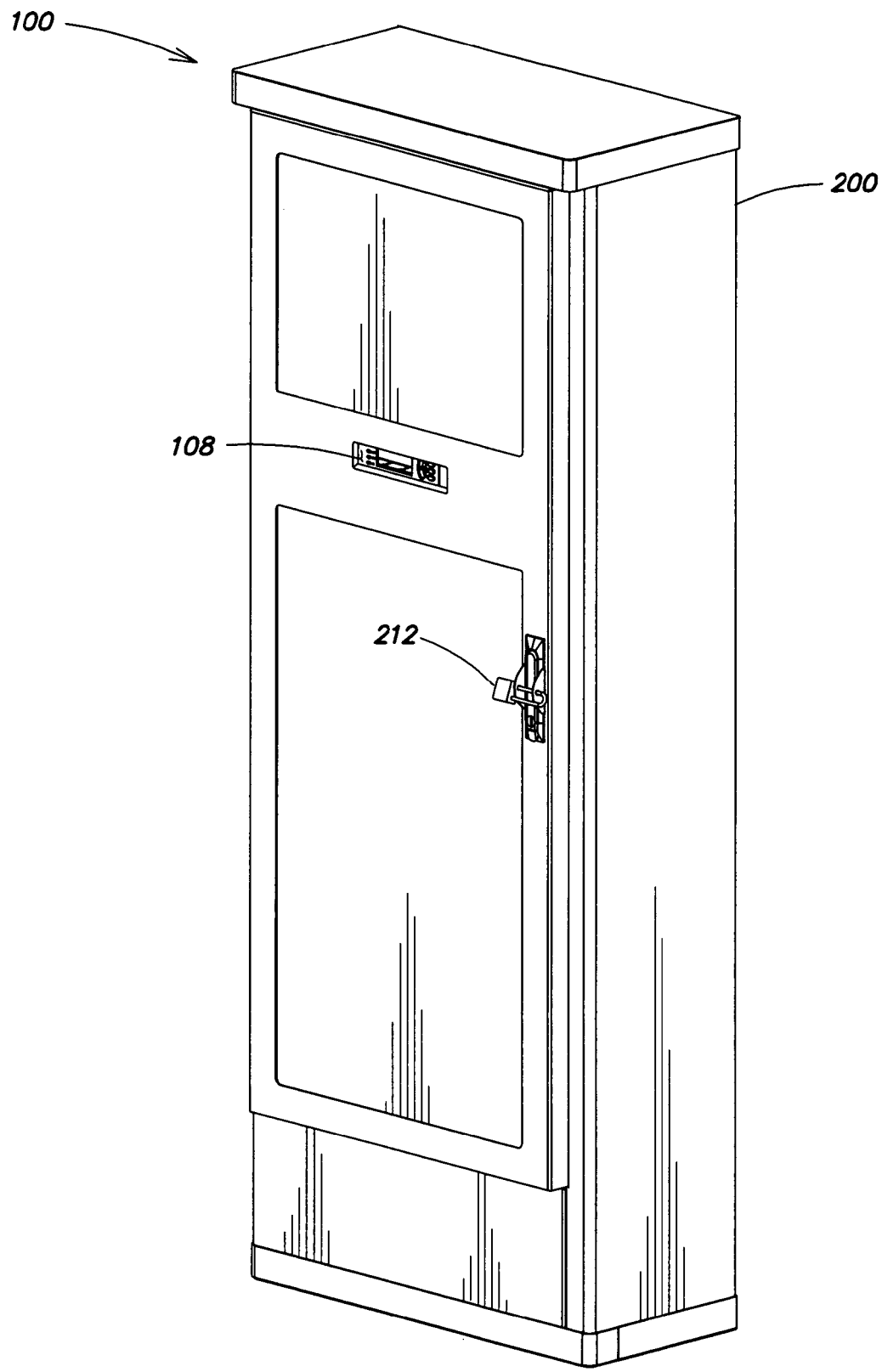
FIG. 4A shows a front perspective view of a power distribution system installed in an enclosure in accordance with one embodiment of the invention.
Figure 4B:
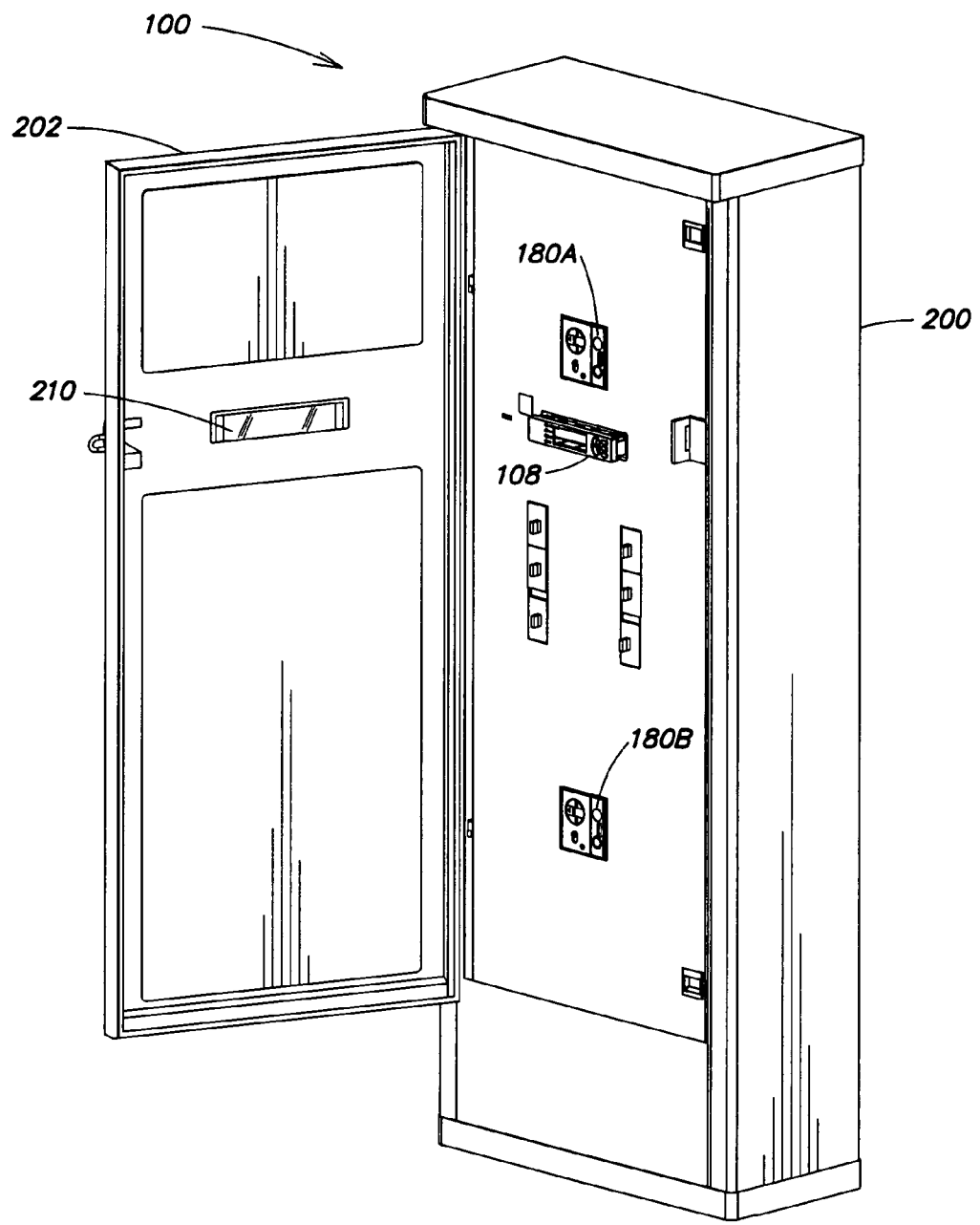
FIG. 4B shows the enclosure of FIG. 4A with a front door of the enclosure in an open position.
Figure 4C:
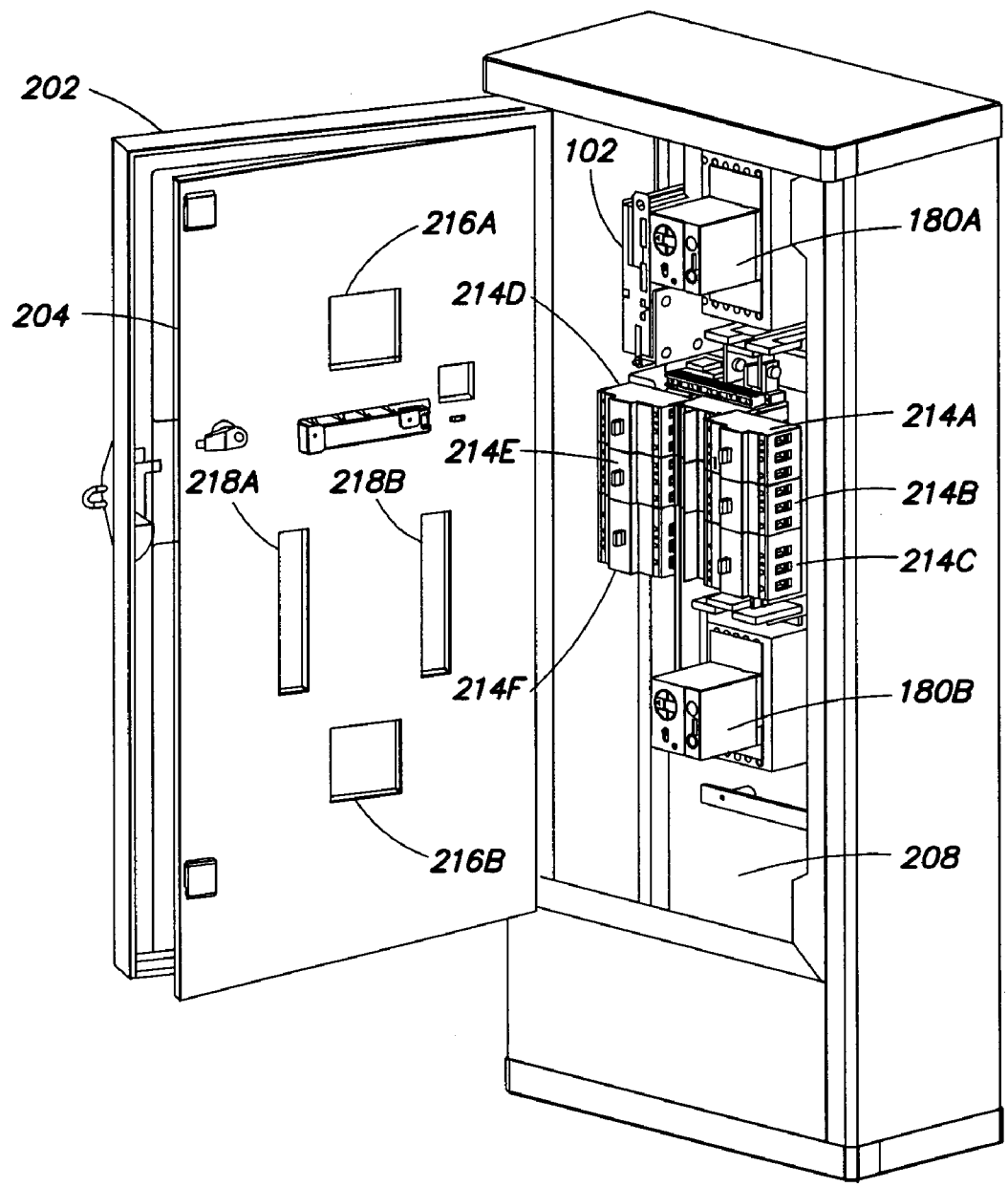
FIG. 4C shows the enclosure of FIG. 4A with both the front door and an inner door in an open position.
Figure 4D:
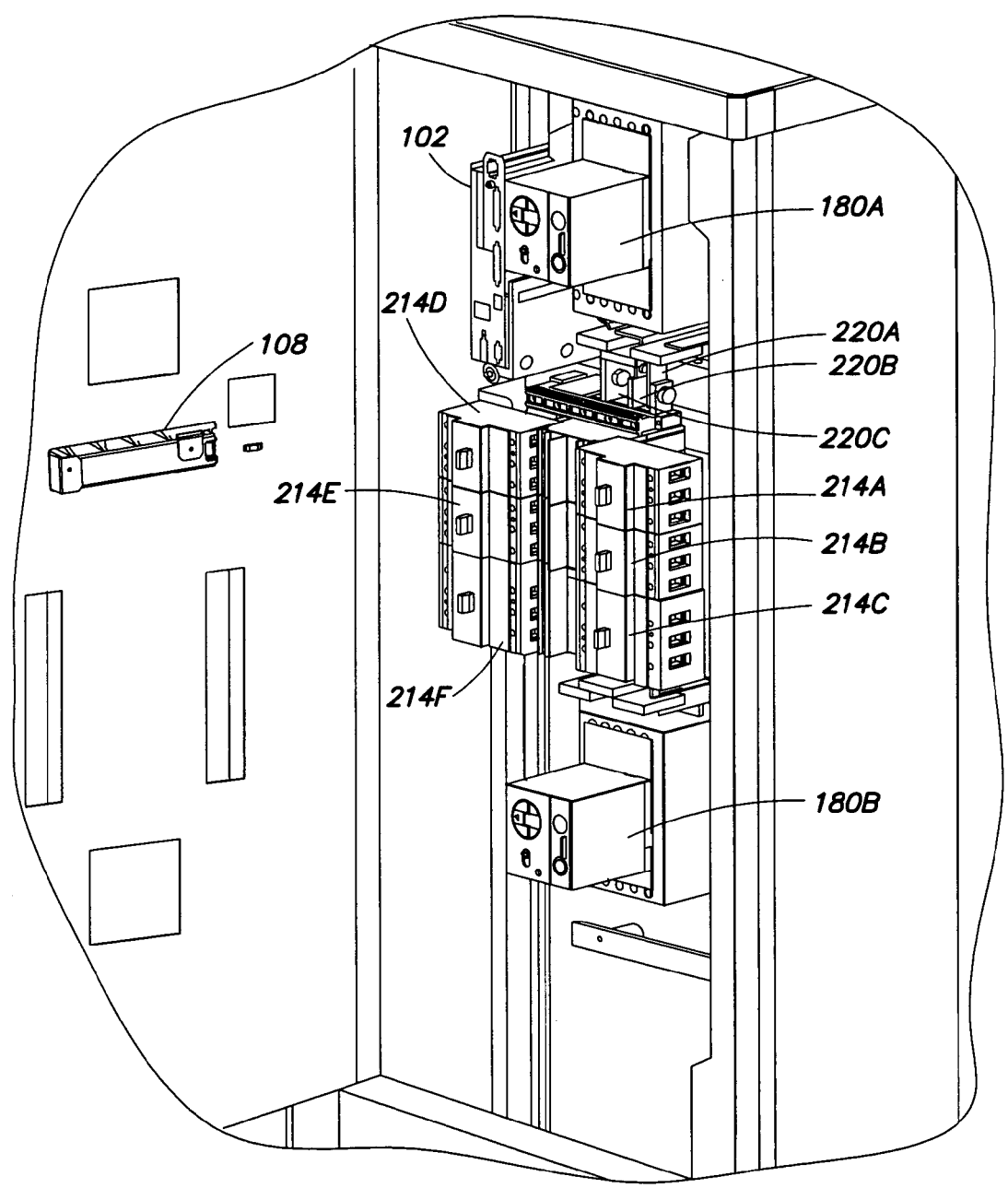
FIG. 4D shows a partial close-up view of components installed in the enclosure of FIG. 4A.

A functional block diagram of the controller 102 in accordance with one embodiment is shown in FIG. 2. The controller 102 includes an ATS control processor 160, EPO circuitry 162, a multiplexer 164, a network interface card 166, digital inputs 168A, digital outputs 170, and analog inputs 172. In one embodiment of the present invention, the processor is implemented using a 16 MHz, XA-G49 microcontroller, having part no. PXAG49 KBA, available from Philips Semiconductors. As shown in FIG. 2, the ATS control processor 160 functions as the controller for the automatic transfer switch, performs power metering functions, maintains system data and exchanges the system data with the network interface card 166.

The analog inputs 172 of the processor are used to receive voltage and current sense signals for monitoring voltages and currents in the system. The digital inputs 168A are used to receive inputs indicative of switch settings within the transfer switch, and the digital outputs 170 provide control signals to the transfer switch.

The EPO circuitry 162 provides the interface for an external emergency power off (EPO) signal. As known to those skilled in the art, in accordance with electrical codes, data facilities may be designed with emergency power off (EPO) switches, the activation of which terminates power to all equipment or a subset of all equipment installed in the facility. The EPO circuitry sends a received EPO signal to the ATS control processor 160 and also sends the EPO signal to the transfer switch 104 through the distribution bus 110. In some embodiments, the EPO circuitry 162 may also include test capabilities and may also include redundant circuits to reduce the possibility of receiving a false power off signal.

External access to the controller 102 is provided through the I$^2$C bus, the multiplexer 164 and/or the network interface card 166. The multiplexer is coupled to a shared RS-232 port and couples signals from the RS-232 port to either the network interface card 166 or directly to the control processor. In one embodiment, direct access to the ATS control processor 160 is provided through the multiplexer to initially provide calibration data to the ATS control processor 160, and to allow field service personnel to conduct troubleshooting of the processor and provide updated calibration data. The shared RS-232 port is also used in one embodiment to provide communications between the network interface card and an external generator through, for example, a data converter 159 (see FIG. 1). The multiplexer is under control of the ATS control processor 160. The network interface card 166 obtains use of the port via a request over the uLink interface. This allows the critical ATS control processor 160 to regain control of the shared RS-232 port if the network interface card 166 experiences a failure.

Data received from the generator may include operational status of various subsystems of the generator, and in one embodiment of the invention, the generator includes a fuel tank float system that allows the generator to determine and to communicate to the controller 102 the remaining fuel in the tank of the generator. Using the fuel data and knowing the load on the generator, the controller can determine the remaining run time before refueling is necessary and provide indication to a user of the run time, and when necessary, an indication that the fuel tank should be refilled. The runtime can be indicated before the utility fails with the system operating from utility power, or when the system is operating from generator power. In one embodiment, in addition to fuel level data, the data from the generator includes coolant temperature and levels, oil level and pressure, and battery voltage. Based on the data from the generator, the system 100 is able to warn a user through the display 108 of actual and possible impending failures of the generator.

The network interface card provides access to the display 108 and an external Ethernet port. In one embodiment, the display 108 is the primary user interface for the system 100, and in one embodiment, the display includes a 4×20 line alphanumeric LCD screen with five keys, LED indicators and an audible alarm. The LCD screen is used to display system status, fault reports and module diagnostic information. The control keys provide the ability to control and configure the system. From the user interface 108, the user can execute several guided help procedures, and in one embodiment, the guided help procedure may be implemented using one of the methods described in U.S. patent application Ser. No. 10/622,952, filed Jul. 18, 2003, titled "System and Method for Performing Guided Procedures," by Colluci et al., which is incorporated herein by reference.

The Ethernet port provides for remote access to the system 100 over the network 154. In different embodiments, the Ethernet port may be compatible with a number of different network protocols, including SNMP, may provide an HTML type web interface, and may be used to send emails regarding the status of the system 100.

The I$^2$C bus may be used to access different external devices, and in one embodiment is used to receive data from a branch circuit monitor coupled to the panel board 106 to provide voltage and current data for each of the branch circuits 118A and 1181B.

The sensors 112, 114 and 116 are used to sense characteristics of the voltage input to the transfer switch 104 and output from the transfer switch. Sensor 112 is coupled to the power line from the generator 150 and is used to monitor output voltage from the generator. The output of sensor 112 is coupled to the controller 102. In one embodiment, sensor 112 is implemented using voltage potential transformers. Sensor 114 is coupled to the power line from the utility main 158 and is used to monitor output voltage from the utility main and is also implemented using voltage potential transformers. Sensor 116 monitors output voltage from the transfer switch 104 and is implemented in one embodiment using voltage potential transformers. In one embodiment, additional redundant sensors may be used to increase reliability of readings from the sensors and to reduce the likelihood of a sensor error resulting in a false indication of a power outage. Further, the use of sensors on both the input and the output of the transfer switch adds redundancy. In one embodiment, power is measured on the utility input through the use of current transformers on the input utility lines. Current transformers may also be used on the input generator lines and in one embodiment, the generator itself includes current transformers and sends power data to the controller.

The transfer switch 104 will now be described in greater detail with reference to FIG. 3, which shows a functional block diagram of the transfer switch used in at least one embodiment. The transfer switch 104 includes two independent motor controlled switches 180A and 180B and a control board 182. The control board 182 provides for distribution of control and sensing signals between the controller 102 and the switches 180A and 180B. In addition, in one embodiment, the control board includes circuits to implement an electrical interlock scheme for the switches that is described in further detail below. In the embodiment shown in FIG. 3, the switches 180A and 180B are implemented using molded case circuit breakers with motor drives such as those available from ABB Control, Inc. of Wichita Falls, Tex., and sold under the brand name ISOMAX, however, other devices may also be used. Each of the switches may be actuated in one of four ways, through the use of the motor, manual mode by a user, electromechanical trip when the current exceeds a threshold, and shunt trip via a stored energy device in the system. In embodiments of the present invention, the use of two independent switches having multiple modes of activation increases the flexibility of the system to address any problems associated with the switches and increase the availability of power from the system 100.

The panel board 106 may be implemented in embodiments of the present invention using a standard circuit breaker panel board in conjunction with standard circuit breakers to distribute the input power to branch circuits 118A and 1181B. In one embodiment of the invention, the panel board may include current and voltage sensors that monitor the voltage and the current on each of the branch circuits and provide data regarding the current and the voltage to the controller 102.

As discussed above, prior art devices for controlling utility/generator transfers are typically engineered on site and as a result have several drawbacks. In one embodiment of the present invention, as will now be described with reference to FIGS. 4A, 4B, 4C and 4D, the system 100 of FIG. 1 may be incorporated in a common enclosure 200, thereby providing a pre-engineered system that is simple to install in the field with little or no site design or engineering required. The common enclosure 200 may be factory assembled and tested and can be tested for certification by third party safety agencies. The enclosure 200 has a front door 202, an inner door 204 and an interior area 208. The display 108 of the system 100 is mounted to the inner door 204 and is accessible through a window 210 in the front door 202. The front door may include a lock 212 that prevents access to the internal components of the system. The window 210 in the front door allows an authorized user (i.e., under password control) to access the system while the front door is locked.

Other than the display 108, the other components of the system 100 are mounted to a back wall of the enclosure 200. As shown in FIG. 3, the switches 180A and 180B are mounted respectively in the top and bottom of the enclosure, and distribution circuit breakers 214A–214F of the panel board 106 (see FIG. 1) are mounted in a central position in the enclosure 200. The switches 180A and 180B are accessible through windows 216A and 216B in the inner door 204 and similarly, the distribution circuit breakers 214A–214F are accessible through windows 218A and 218B of the inner door 204. The use of the windows in the inner door allows a user to open the front door 202 to manually inspect and control the switches and the distribution circuit breakers without being exposed to harmful voltages.

The system shown in FIGS. 4A through 4D is designed for use as a three phase system, however, as understood by those skilled in the art, the system may also be designed for use as a single phase system, and systems and methods of the invention may be used with numerous different input power and voltage configurations. The enclosure 200 includes three bus bars 220A, 220B and 220C (best seen in FIG. 4D) that extend from the top switch 180A to the bottom switch 180B beneath the distribution circuit breakers 214A–214F to transfer the input voltages from the switches to the distribution circuit breakers. In one embodiment, the switches 180A and 180B, as well as the distribution circuit breakers 214A–214F, are bolted directly to the bus bars 220A, 220B and 220C, eliminating the need for costly connectors, which can also introduce points of failure. In the embodiment shown in FIGS. 4A–4D, only six distribution circuit breakers are shown, however, in other embodiments of the invention, either more or fewer distribution circuit breakers may be installed in the enclosure 200. Also both single phase and three phase circuit breakers may be used in the same enclosure.

The controller 102 is mounted in the top part of the enclosure 200 adjacent the top switch 180A. The display 108 is coupled to the controller using a flexible cable (not shown). The control board 182 of the transfer switch 104 is located in the enclosure 200 in a slide-in module. In one embodiment, the sensors 112, 114 and 116 (see FIG. 1) are also installed in the enclosure 200.

In one embodiment, power to and from the enclosure 200 may be run through conduits that interface with either the top panel or the bottom panel of the enclosure, however, in other embodiments power may be routed through the sides of the enclosure. Similarly, data interfaces to the system 100 may be through the top, bottom or sides of the enclosure.

As discussed above briefly, the use of switches 180A and 180B, under the control of the controller 102 and/or through manual intervention by a user provides increased flexibility in power options using two sources of input power. In prior art transfer switches, it is common to use a transfer switch having a mechanical interlock that prevents the output of the transfer switch from being simultaneously coupled to two input sources of power. Accordingly, there is a brief interruption of power that occurs when transitioning from one source of power to another. In at least one embodiment of the invention, an interlock scheme is used that allows for both an open transfer and a closed transfer from one input source to another. In the discussion that follows, an open transfer refers to a transfer in which power from the first source is switched off before power from the second source is switched on, and a closed transfer refers to a transfer in which when transferring from a first source to a second source, power is provided from each source for at least a brief period of time, such that there is no interruption of power.

To prevent any glitches in power when performing a closed transition between two sources of power, both sources of power may be synchronized prior to transfer. When one source of power is a utility, and the other source of power is a generator, it may be difficult or not possible to synchronize the waveforms. In one embodiment of the invention, a closed transition may still be accomplished by setting the frequency of the generator to be slightly more or less than the frequency of the power from the utility. When a closed transfer is to occur from a first source to a second source (i.e., either from the generator or to the generator), the controller 102 monitors the voltage waveforms from both sources to establish a time pattern as to when the two sources are most closely matching in phase. Then, in anticipation of the next time the two sources are in-phase, the closed command is executed, taking into account the time required to close the switch for the second source. Both switches are in the closed position for a brief period of time, and the switch for the first source is then tripped opened by means of an electrical interlock to disconnect the load from the first source. The time required to actuate a switch is monitored by the controller 102 over the life of the product so that adjustments can be made as the switches and actuators age, or are replaced during service.

Figure 5:
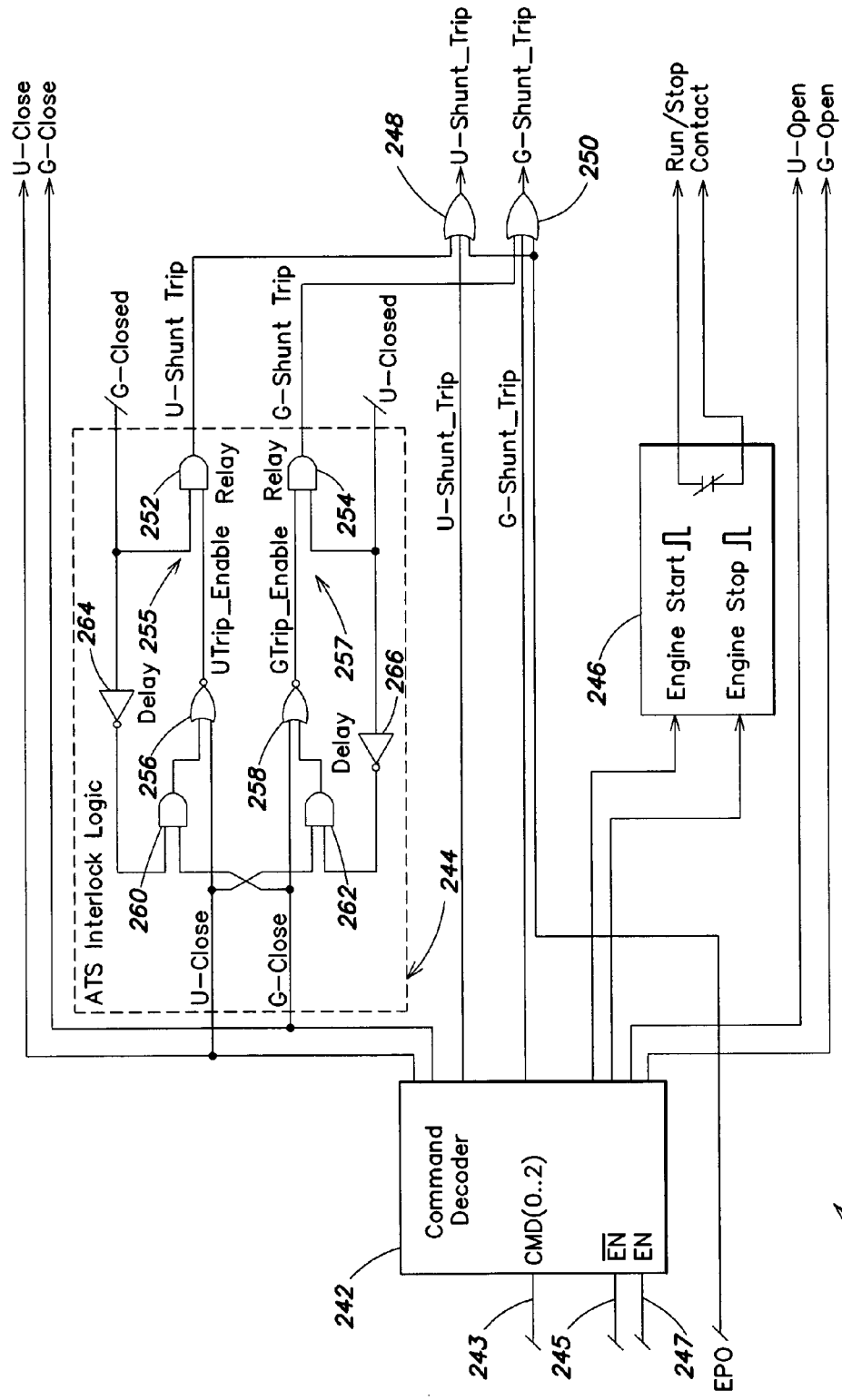
FIG. 5 shows a functional block diagram of a control circuit installed in the transfer switch of FIG. 4.

An interlock scheme used in embodiments of the invention to prevent undesirable simultaneous application of both sources while allowing closed transfer when desirable will now be described with reference to FIG. 5, which provides a functional block diagram of control circuitry 240 contained on the control board 182 of the transfer switch 104. In FIG. 5, various functions are shown as logic gates. As understood by those skilled in the art, the functions indicated may be implemented in a number of ways using analog circuits, digital circuits or a combination of both. The control circuitry includes a command decoder 242, interlock logic circuit 244, generator control circuitry 246 and output gates 248 and 250. The command decoder 242 receives a command signal on line 243 from the controller 102 over the distribution bus 110 and decodes the commands, upon opposing assertion of the enable signals 245 and 247, to provide one of a number of output commands to control the states of switches 180A and 180B, and the generator control circuit 246. As indicated in FIG. 5, the EPO signal passes directly from the distribution bus 110 to the output gates 248 and 250.

In one embodiment, the command decoder is implemented such that only one command is issued at a time from the decoder. Table 1 below shows the commands that may be issued from the command decoder and the resulting action that occurs.

TABLE 1

| Command | Resulting Action |
| --- | --- |
| Engine Start | Put the generator control circuitry 246 in the RUN position. |
| U-Close | Closes the utility switch 180B using the motor controller |
| G-Close | Closes the generator switch 180A using the motor controller |
| U-Open | Opens the utility switch 180B using the motor controller |
| G-Open | Opens the generator switch 180A using the motor controller |
| U-Shunt Trip | Provide a shunt trip of switch 180B |
| G-Shunt Trip | Provide a shunt trip of switch 180A |
| Engine Stop | Put the generator control circuitry 246 in the STOP position. |

In one embodiment, gate 248 is coupled to the shunt trip input of switch 180B, and is implemented simply as three sources which drive the shunt trip under relay control. Logically speaking, gate 248 causes a shunt trip of switch 180B either in response to the command U-shunt trip from the command decoder, in response to an EPO signal, or in response to a U-shunt trip signal from the interlock logic circuit 244. Similarly, gate 250 is coupled to the shunt trip input of switch 180A, and is implemented simply as three sources which drive the shunt trip under relay control. Logically speaking, gate 250 causes a shunt trip of switch 180A either in response to the command G-shunt trip from the command decoder, in response to an EPO signal, or in response to a G-shunt trip signal from the interlock logic circuit 244.

The interlock logic circuit 244 prevents unintentional simultaneous closing of both switches 180A and 180B while allowing both switches to be closed for a brief period of time to intentionally perform a closed transition. In one embodiment, the brief period of time when both switches may be closed is approximately 20 ms, which is approximately equal to one line cycle.

The logic circuit 244 includes a utility shunt trip circuit 255 and a generator shunt-trip circuit 257. The utility shunt trip circuit includes an AND gate 252, a NOR gate 256, an AND gate 260 and a delay circuit 264. The generator shunt trip circuit includes an AND gate 254, a NOR gate 258, an AND gate 262 and a delay circuit 266. As discussed above, in one embodiment the delay of the delay circuit is set to approximately 20 ms. The interlock logic circuit 244 prevents an operator from manually closing both switches, but allows the system 100 to close both circuits for a set period of time during a closed transition. In the normal rest state, both UTRIP_ENABLE and GTRIP_ENABLE are asserted leaving relays 252 and 254 closed, and providing electrical interlock. During a closed transition from utility to generator, the G-CLOSED signal from the command decoder is asserted and the utility shunt trip circuit 255 disables the U-shunt trip signal by opening relay 252. Then, once the generator switch closes, and has been closed longer than a predetermined delay set by the delay circuit 264, the U-shunt trip is re-enabled so that the utility switch is shunt tripped open. Similarly, during a closed transition from generator to utility, the U-CLOSED signal from the command decoder is asserted and the generator shunt trip circuit 257 disables the G-shunt trip signal by opening relay 254. Then, once the utility switch closes, and has been closed longer than a predetermined delay set by the delay circuit 266, the G-shunt trip is re-enabled so that the generator switch is shunt tripped open.

Figure 6:
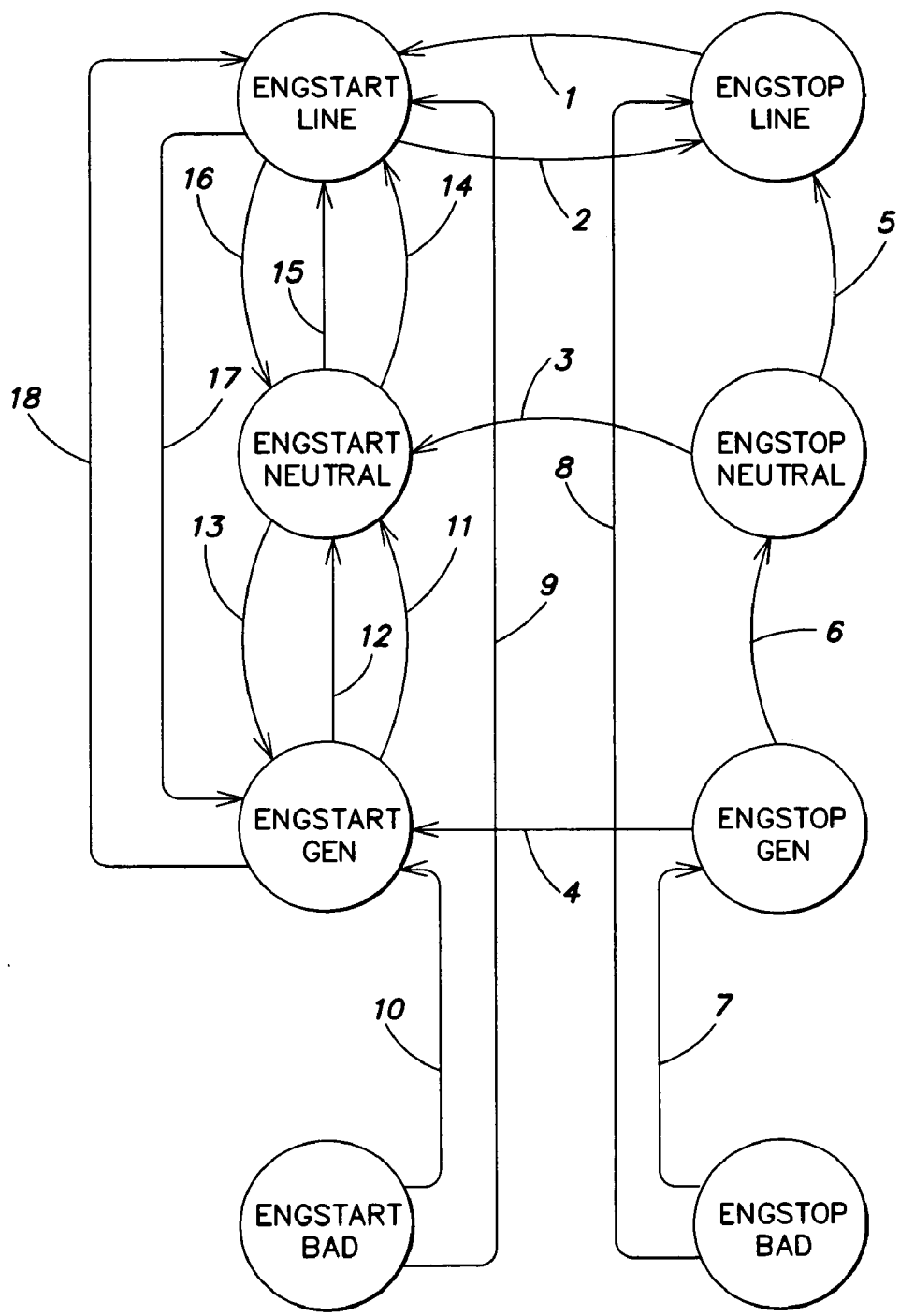
FIG. 6 shows a state diagram of a controller used in one embodiment.

In different embodiments of the invention, the operational state of the system 100 may be controlled by the controller 102 to achieve different objectives. In one embodiment, which will now be described with reference to Tables 2–4 and FIG. 6, the controller, in an automatic mode, controls the system 100 to couple loads to a best available source of power (i.e., utility or generator). Table 2 provides a description of operational states of the system 100, Table 3 provides a description of transitional variables for the system, FIG. 6 is a state diagram for the system, and Table 4 provides a description for transfer conditions between states in the state diagram of FIG. 6.

TABLE 2

| State Name | State Description | EngineStart | GenBreakerClose | LineBreakerClose |
| --- | --- | --- | --- | --- |
| ENGSTOPNEUTRAL | This state is not an intended operational state, but may be entered when the state machine transfers into the automatic mode of operation from a fault or from a manual mode of operation. In this state there is no output power from the system. | 0 | 0 | 0 |
| ENGSTOPLINE | This is the most common state of operation. The utility is connected to the load, and the generator engine is stopped. This state is exited when the generator needs to be started (ENGSTARTLINE) in anticipation of switching the load to the generator source. | 0 | 0 | 1 |
| ENGSTOPGEN | This state is not an intended operational state, but may occur in case of a failure in the switch hardware or customer misuse. This state is entered when the state machine transfers into the automatic mode of operation from a fault or from a manual mode of operation. | 0 | 1 | 0 |
| ENGSTOPBAD | This state is not an intended operational state, but may occur in case of a failure in the switch hardware or customer misuse. This state is entered when the state machine transfers into the automatic mode of operation from a fault or from a manual mode of operation. | 0 | 1 | 1 |

TABLE 2-continued

| State Name | State Description | EngineStart | GenBreakerClose | LineBreakerClose |
|---|---|---|---|---|
| ENGSTARTNEUTRAL | This state exists so that an "open" transition can be performed. When switching between two dissimilar sources (out of phase at same frequency, radically different frequency or voltage, etc), the load needs to power down in an intermediate state in which it is not connected to either power source. | 1 | 0 | 0 |
| ENGSTARTLINE | This state is not an intended operational state, but may occur in case of a failure in the switch hardware or customer misuse. This state is entered when the state machine transfers into the automatic mode of operation from a fault or from a manual mode of operation. | 1 | 0 | 1 |
| ENGSTARTGEN | This is the state in which the load is connected to the generator source either due to a utility failure or a test of the generator system. | 1 | 1 | 0 |
| ENGSTARTBAD | This state is not an intended operational state, but may occur in case of a failure in the switch hardware or customer misuse. This state is entered when the state machine transfers into the automatic mode of operation from a fault or from a manual mode of operation. | 1 | 1 | 1 |

In Table 2, the right most three columns show the status of the generator switch (GenBreakerClose), the utility switch (LineBreakerClose) and whether the generator is on or off (EngineStart) for each of the states. For each of the switches, a "1" indicates that the switch is closed and a "0" indicates that the switch is open. For the Generator column, a "1" indicates that the generator is on and a "0" indicates that the generator is off.

Table 3 provides a listing and description of transitional variables used to determine status of the system in one embodiment.

TABLE 3

| Transition Variable Name | | Description |
|---|---|---|
| TV_LineGood | | Bit signifies that the utility can be safely passed to the load. |
| | Set | Set when the utility voltage magnitude, frequency, stability, phase balance and rotation is acceptable to the load. |
| | Clr | Cleared when the utility voltage magnitude, frequency, stability, phase balance and rotation is unacceptable to the load. |
| TV_Committed | | Signifies the load must be placed on the generator once it has been started. |
| | Set | Set when the generator is started due to unacceptable line quality (LineGood is clear). |
| | Clr | Cleared when the generator is connected to the load, or when the generator has not produced acceptable output (GenGood is clear) within a set period of time. This bit is also reset upon exit of automatic mode. |
| TV_GenGood | | Bit signifies that the generator output can be safely passed to the load. |
| | Set | Set when the generator voltage magnitude, frequency, stability, phase balance and rotation is acceptable to the load. |
| | Clr | Cleared when the generator voltage magnitude, frequency, stability, phase balance and rotation is unacceptable to the load. |
| TV_AllowClosed | | Bit signifies closed transitions (brief period where both breakers are closed) may be performed to make power source switch seamless to customer's load (useful for retransfers and gen load tests). If bit is not set wait in the NEUTRAL position switching between the LINE and GEN positions. |
| | Set | Set when closed transfers have not been prohibited by user through user interface. |
| | Clr | Cleared when open transfers between live power sources is requested by user through user interface. |

TABLE 3-continued

| Transition Variable Name | | Description |
|---|---|---|
| TV_InPhaseHopeless | | Signifies that the utility and generator voltages are unlikely to satisfy the InPhase conditions in a reasonable amount of time and an open transfer/retransfer would be best for the customer. |
| | Set | Set when InPhase has not been set for a configurable period to time or when voltage, frequency, or rotation of utility and generator are too dissimilar to allow a closed transition. |
| | Clr | Cleared when InPhase is set. |
| TV_GenStableDelay | | Bit signifies that the generator voltage has been safe for the load for a configurable period of time. |
| | Set | Set when TV_GenGood has been set for the GenStableDelay period of time. |
| | Clr | Cleared when TV_GenGood is cleared. |
| TV_GenStartDelay | | Signifies that the utility has been unacceptable for a long enough period of time that the generator should be started without being a nuisance to the customer. |
| | Set | Set when TV_LineGood has been clear for a user configurable delay. |
| | Clr | Cleared when TV_LineGood is set. |
| TV_OpenXDelay | | Signifies that the load has been detached from a source of power long enough to have completely powered down. |
| | Set | Set when the transfer switch has been in the NEUTRAL position for a configurable period of time. |
| | Clr | Cleared when the transfer switch is not in the NEUTRAL position. |
| TV_InPhase | | Bit signifies that the utility and generator voltages are close enough in phase so that a closed transition will not affect the load. |
| | Set | Set when a predetermined set of conditions are satisfied based upon voltage or period measurements of the utility and generator voltages. |
| | Clr | Cleared when a predetermined set of conditions are not satisfied based upon voltage or period measurements of the utility and generator voltages. |
| TV_LineMotorPowered | | Signifies that the motor used to open and close the breaker that connects the load to the utility has sufficient voltage to operate. |
| | Set | Set when the voltage between utility phase A and B is greater than the sufficient voltage level. |
| | Clr | Cleared when the voltage between utility phase A and B is less than the sufficient voltage level. |
| TV_LineStableDelay | | Signifies that the utility has been safe for the load for a configurable period of time. |
| | Set | Set when TV_LineGood has been set for the LineStableDelay. |
| | Clr | Cleared when TV_LineGood is cleared. |
| TV_GenCooldownDelay | | Signifies that the generator has been run unloaded for a configurable period of time (note that most generators include this feature in their own controllers, so this delay is most often going to be 0). |
| | Set | Set when the generator has been on without the transfer switch in the GEN position for the GenCooldownDelay period. |
| | Clr | Cleared when the transfer switch is in the GEN position or when the generator is turned off. |
| TV_MinGenDelay | | Signifies that the generator has been run loaded for a configurable period of time. |
| | Set | Set when the generator has been on with the transfer switch in the GEN position for the MinGenDelay. |
| | Clr | Cleared when the transfer switch is not in the GEN position or when the generator is turned off. |
| TV_GenStartTest | | Bit signifies that the Generator is to be tested by starting it and running it under no load often as a predecessor to TV_Gen_Load_Test command. |
| | Set | Set by a scheduler or user interface. |
| | Clr | Cleared by the scheduler or user interface. |
| TV_InhibitGenStart | | Signifies that the customer has instructed starts of the generator to be disabled when a contact input condition is present. |
| | Set | Configured through a user interface and set through contact input. |
| | Clr | Configured through a user interface and cleared by contact input. |

TABLE 3-continued

| Transition Variable Name | | Description |
|---|---|---|
| TV_GenLoadTest | | Bit signifies that the generator is to be tested by running it under load. |
| | Set | Set up a scheduler or user interface. |
| | Clr | Cleared by the scheduler or user interface. |
| TV_EngcontactClosed | | Signifies that the engine start contact that the firmware controls to start the generator is in the closed position. |
| | Set | Set when the ENGSTARTCONTACT signal is present for one line cycle. |
| | Clr | Cleared when the ENGSTARTCONTROL signal is not present for one line cycle. |
| TV_PreviouslyLine | | Signifies that the last switch position selected in the Automatic mode was LINE. |
| | Set | Set upon transition to a state in which Automatic is set, and the Switch Position bits are in the LINE position. |
| | Clr | Cleared upon transition to a state in which Automatic is not set, or the Switch Position bits are not in the LINE position. |
| TV_InihibitXfer | | Signifies that the customer has instructed transfers (switch from utility to generator) to be disabled. |
| | Set | Set through the user interface. |
| | Clr | Cleared through the user interface. |
| TV_InihibitReXfer | | Signifies that the customer has instructed retransfers (switch from generator to utility) to be disabled. |
| | Set | Set through the user interface. |
| | Clr | Cleared through the user interface. |

The controller 102 reacts to changes in the states of the variables and moves the system between the operational states. FIG. 6 shows a state diagram of the operational states with numbered arrows indicating a transfer between states. Each of the numbered arrows corresponds to a particular set of states of the transitional variables and Table 4 provides a description of the sets of states corresponding to each of the numbered transfers in FIG. 6. In Table 4, the "TV" prefix in front of each of the transition variables has been removed for simplicity.

TABLE 4

| No. | Transition Variable States |
|---|---|
| 1 | (LineGood@GenStartDelay+GenStartTest)*InhibitGenStart |
| 2 | (LineGood*Committed*GenStartTest) @GenCooldownDelay |
| 3 | LineGood*InhibitGenStart |
| 4 | GenGood*InhibitGenStart |
| 5 | LineGood |
| 6 | GenGood |
| 7 | PreviouslyLine |
| 8 | PreviouslyLine |
| 9 | PreviouslyLine |
| 10 | PreviouslyLine |
| 11 | LineGood*InhibitReXfer*GenLoadTest*(AllowedClosed+ InPhaseHopeless)@(MinGenDelay*LineStableDelay) |
| 12 | GenGood*LineMotorPowered*InhibitReXfer |
| 13 | GenGood@(GenStableDelay*OpenXDelay) |
| 14 | LineGood*Committed*GenLoadTest @(LineStableDelay*OpenXDelay) |
| 15 | GenGood*LineMotorPowered*Committed @OpenXDelay |
| 16 | GenGood*(Committed+GenLoadTest)*InhibitXfer* (AllowClosed+InPhaseHopeless)@GenStableDelay |
| 17 | AllowClosed*InhibitXfer*(Committed+ GenLoadTest)*GenGood*InPhase@GenStableDelay |
| 18 | AllowClosed*LineGood*InhibitReXfer*GenLoadTest*InPhase@ (MinGenDelay*LineStableDelay) |

In Table 4, a line over a variable indicates that the variable is in the "0" state, while the absence of a line indicates that the variable is in the "1" state. In Table 4 the symbol "*" equals "AND", "+" equals "OR" and "@" means "After a Delay."

The above defined operational states, transitional variables and state diagram are applicable for an automatic system operating in a best available source mode of operation, with operation on utility being a normal mode of operation. As readily understood by those skilled in the art, in other embodiments, the system may operate in a preferred source mode (with either the utility, a generator, or some other source functioning as the preferred source) or the system may operate in a generator normal mode with operation on generator being a normal mode of operation.

In the system 100, in one embodiment, when operating in an on line mode (ENGSTOPLINE), and utility power is lost, the system will start the generator and move to a standby generator mode (ENGSTARTNEUTRAL). In this mode of operation, there is no output power from the system 100. However, critical systems in a facility containing the system 100 may still be powered from UPS's. The system 100 in one embodiment of the invention will then switch from the standby generator mode to an on generator mode (ENGSTARTGEN) once the generator is fully up and running. However, in other embodiments of the invention, as discussed in further detail below, the system 100 may delay switching to generator mode based on remaining battery run time of UPS's in the facility.

In the operation of the system described above, the generator is turned on in standby mode after a utility power outage has occurred. In another embodiment, the system may determine that there is an increased likelihood of a power outage and turn the generator to standby mode in anticipation of an outage. The determination may be made based on characteristics of the power itself (i.e., power fluctuations) or based on environmental conditions (i.e. severe weather conditions). The system may also, based on these determinations, switch to operation in generator mode (ENGSTARTGEN) before an outage occurs.

When operating in generator mode, when utility power returns, the system may either conduct an open transition from generator mode to line mode or may perform a closed transition in the manner described above. In one embodiment in which the generator is run at a slightly higher frequency than the line frequency, the system will attempt to perform a closed transition when the voltage wave form of the generator and the line are both in-phase, and after a set period of time, which may be equal to a specific number of line cycles, if there is no alignment of the waveforms, the system will perform an open transition. In one embodiment of the invention, prior to performing a closed transition from generator mode to line mode, the system checks phase rotation of the input utility line to ensure that it has not changed and is consistent with that of the generator.

Several advantages are provided by using the interlock scheme and motor controlled switches in embodiments of the present invention. In particular, the ability to conduct closed transitions allows the system 100 to periodically test a connected generator and to test operation of the transfer switch both in an open mode and under full load. In one embodiment, a maintenance schedule of the generator can be stored in the controller 102, and the controller can, in accordance with the maintenance schedule, periodically power on the generator and through a closed transition switch the transfer switch to generator mode to allow the generator to be run under load. Once a test time is completed, the controller can perform a closed transition back to line mode of operation. The use of motor controlled switches also allows the system to override a manual opening of the switches to prevent an operator from powering down a critical system.

As discussed above briefly, the transfer switch circuit breakers 180A and 180B, under the control of the controller 102 and/or through manual intervention by a user provide increased flexibility in power options using two sources of input power.

In one embodiment of the present invention, the controller 102 may be powered directly from the power panel board 106 and may include an internal battery along with associated charge circuitry to allow the controller to remain operational during power outages. In another embodiment, the controller 102 may be coupled to the battery of the generator. This coupling allows the controller to measure the voltage of the generator battery and in addition, the controller can use generator battery power as its primary source of power or as a backup source of power.

Embodiments of the present invention also provide for improved generator performance and availability. Typically, generator manufacturers discourage operation of their generators at less than approximately 35% full load as deposits can build up in the exhaust systems of the generators. In embodiments of the present invention, the load and run time of the generator are monitored and logged. If the generator has run for a period of time (typically 50 to 100 hours) beyond manufacturer specifications at less than full load, then the controller 102 can provide an indication to an operator of the need to perform a load test on the generator to burn out any deposits in the exhaust system.

During the installation of generators in prior art systems, an electrician typically must install an additional power drop to provide power to the generator for battery charging and for heating of the coolant in the generator. In one embodiment of the present invention, one of the power distribution legs 118A or 118B may be dedicated to provide power to the generator for one or both of battery charging and heating of the coolant. In this embodiment, the controller 102 may monitor the charging current being supplied to the generator through a sensor coupled to the power distribution leg and may also monitor the status of the circuit breaker for this power distribution leg. Typically, during maintenance of a generator, the circuit breaker for the battery charging circuit of the generator is opened to remove all power to the generator. With many prior art systems, it is not uncommon for the breaker to be accidentally left open after service is complete. In embodiments of the present invention, the controller can detect that the breaker has been left open and notify a user to remedy the situation. In one embodiment of the invention, the enclosure 200 may also include a transformer to convert an output voltage to that necessary for a particular generator.

Typically, the transfer of an automatic transfer switch (ATS) can be a startling event for anyone in the vicinity of the ATS, particularly since a back-up generator is typically run infrequently. In one embodiment of the present invention, the controller 102 is coupled to an alarm that is located in the vicinity of the generator, and immediately prior to actuation of switching of the transfer switches, the controller 102 activates the alarm to warn personnel that the switch will be actuating. In one embodiment, both an audible and visual alarm is used, however, in other embodiments, either an audible or visual alarm may be used.

As described above, embodiments of the present invention provide a single system that allows monitoring and switching of power from multiple sources using a single enclosure that houses components of the system. In addition, as discussed above, the controller of system 100 of one embodiment of the present invention is configured to communicate with facility devices and a central facility controller either over direct connections or through a network. As will now be described, this communication allows the system 100 to be integrated into a complete facility control system to provide enhanced power control capabilities for a facility and coordinate distribution of power to facility equipment based on the availability of power from at least one utility source and one generator.

In one embodiment, either the controller 102, the facility manager 155, or a combination of the two may be used to monitor run time of UPS's in the facility, monitor run time of one or more generators and provide load shedding and power cycling to maximize power availability to all devices in the facility. In one embodiment, the controller 102 can monitor the load on the generator and communicate with the facility manager 155 to control the draw of power from the generator to ensure that the maximum power rating of the generator is not exceeded. To reduce power load, the facility manager may cycle facility air conditioners based on thermal loads, measured room temperatures and available power. Also, communication between UPS's in a facility and the facility manager 102 and the system 100 allows the system to determine optimum run times before switching, after a utility failure, from operation on UPS's to operation using the generator. In one embodiment, in which changeover from operation on generator power to utility power is an open transition (with a brief power outage), the system 100 may be programmed to change from UPS power to generator power with sufficient run time left on the UPS batteries to allow for a second UPS mode of operation after utility power has returned. In another embodiment, to reduce power load when running from the generator, the system 100 may communicate to the UPS's (either directly or through facility manager 155) that power is being provided from a generator, and in response, the UPS's may operate in a reduced power mode, where non-essential features are not operative, and in which battery charging is turned off.

Figure 7:
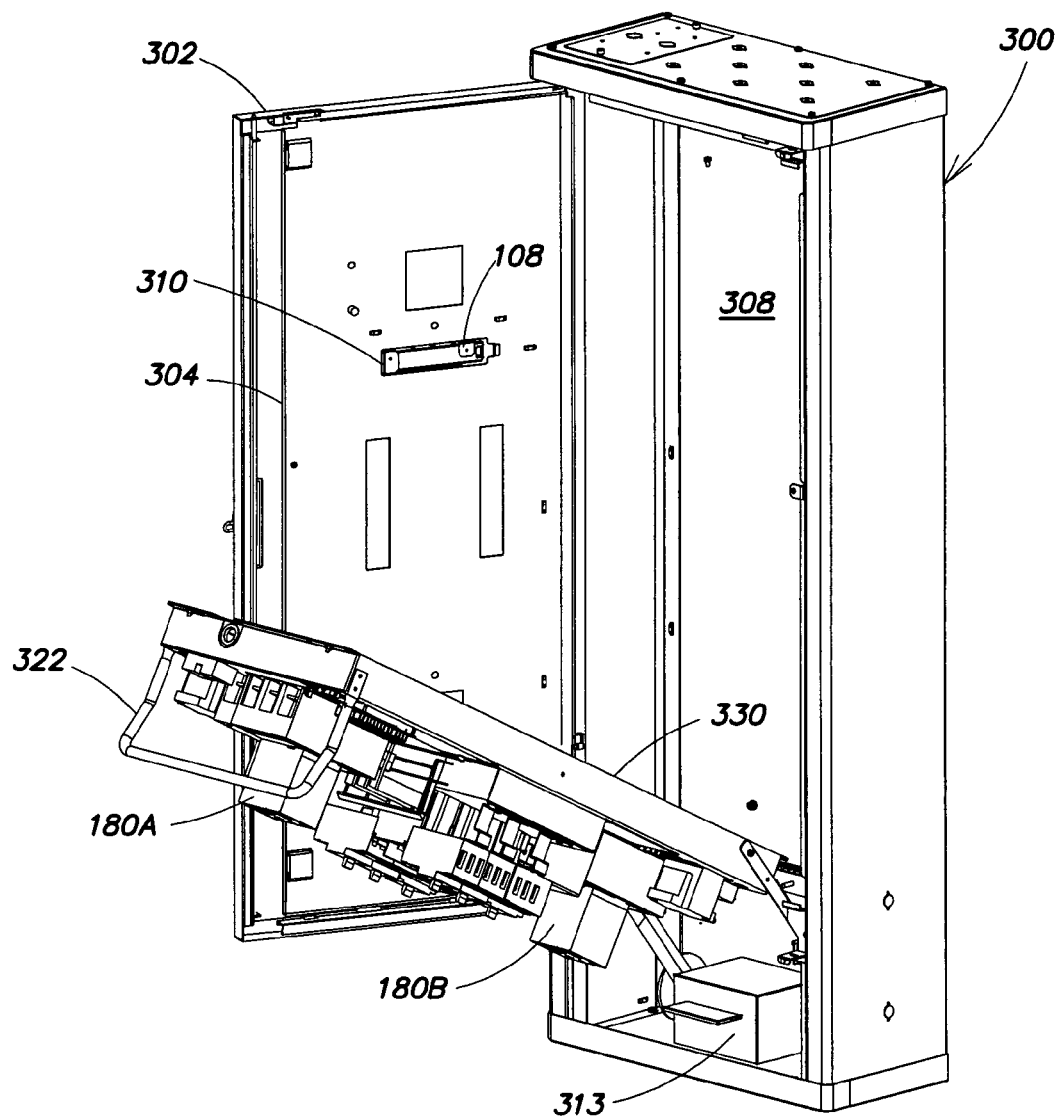
FIG. 7 shows an enclosure used in one embodiment of the present invention.
Figure 8:
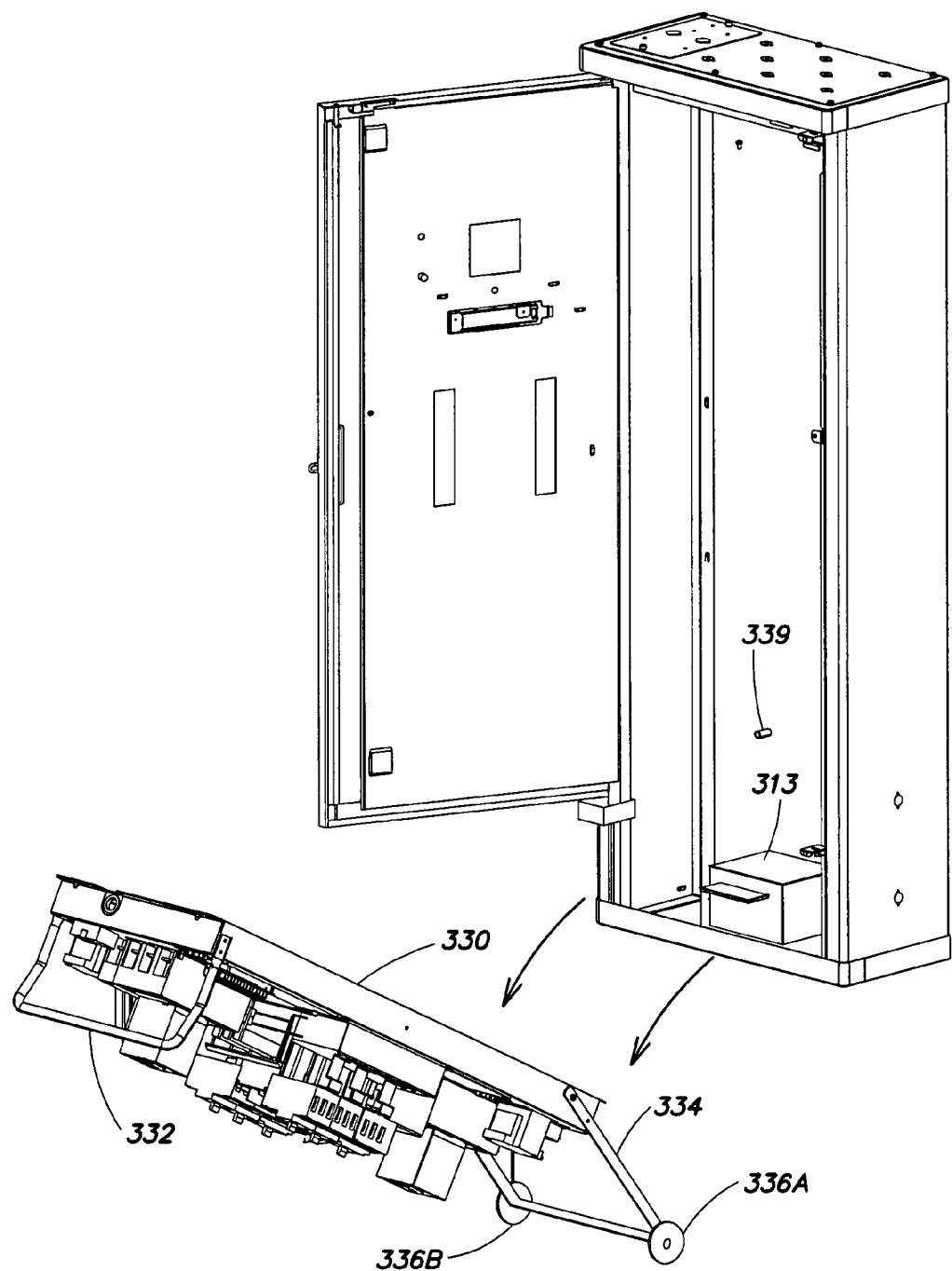
FIG. 8 shows the enclosure of FIG. 7 with an internal panel removed.
Figure 9A:
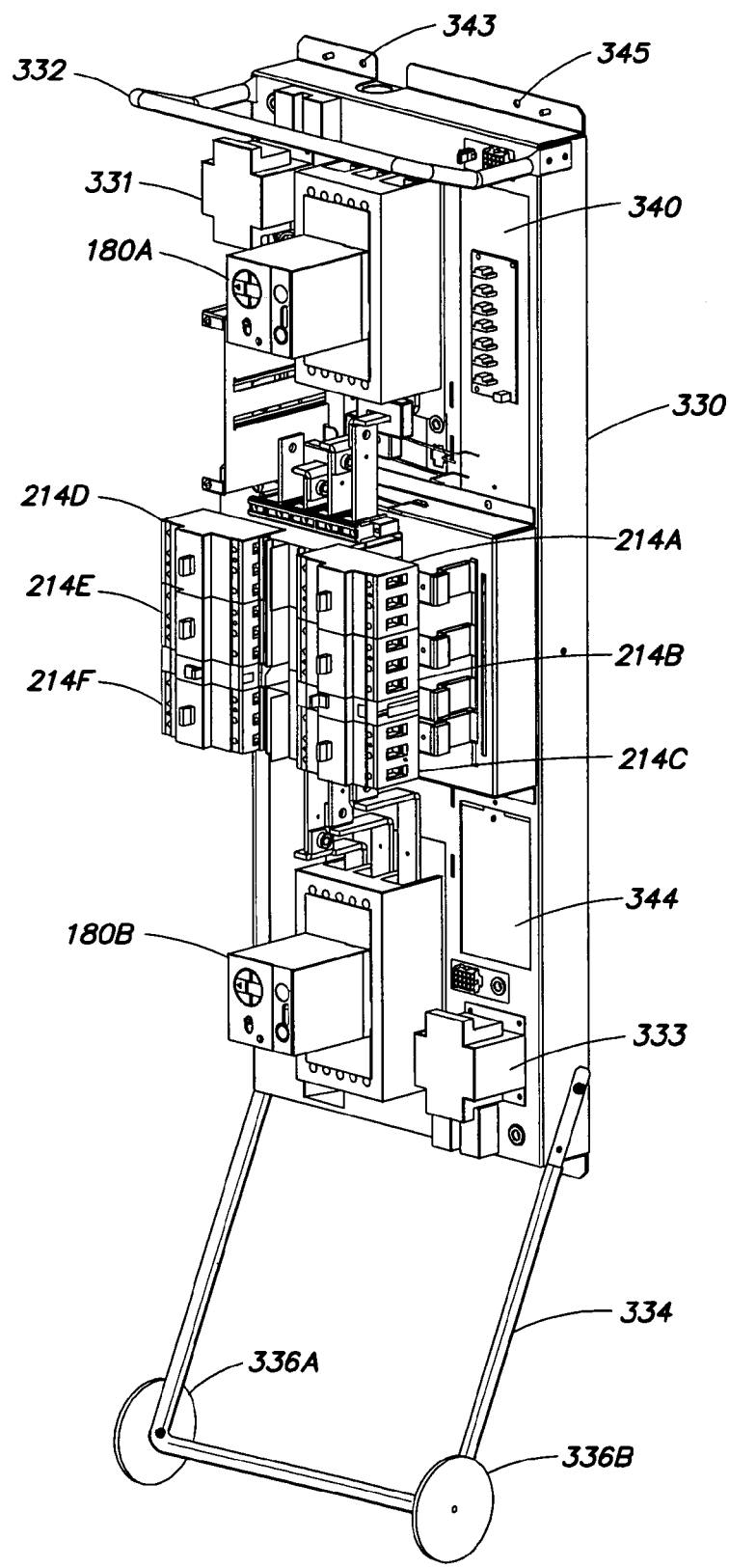
FIGS. 9A and 9B respectively show a perspective view and a front view of the removable internal panel of FIG. 8.
Figure 9B:
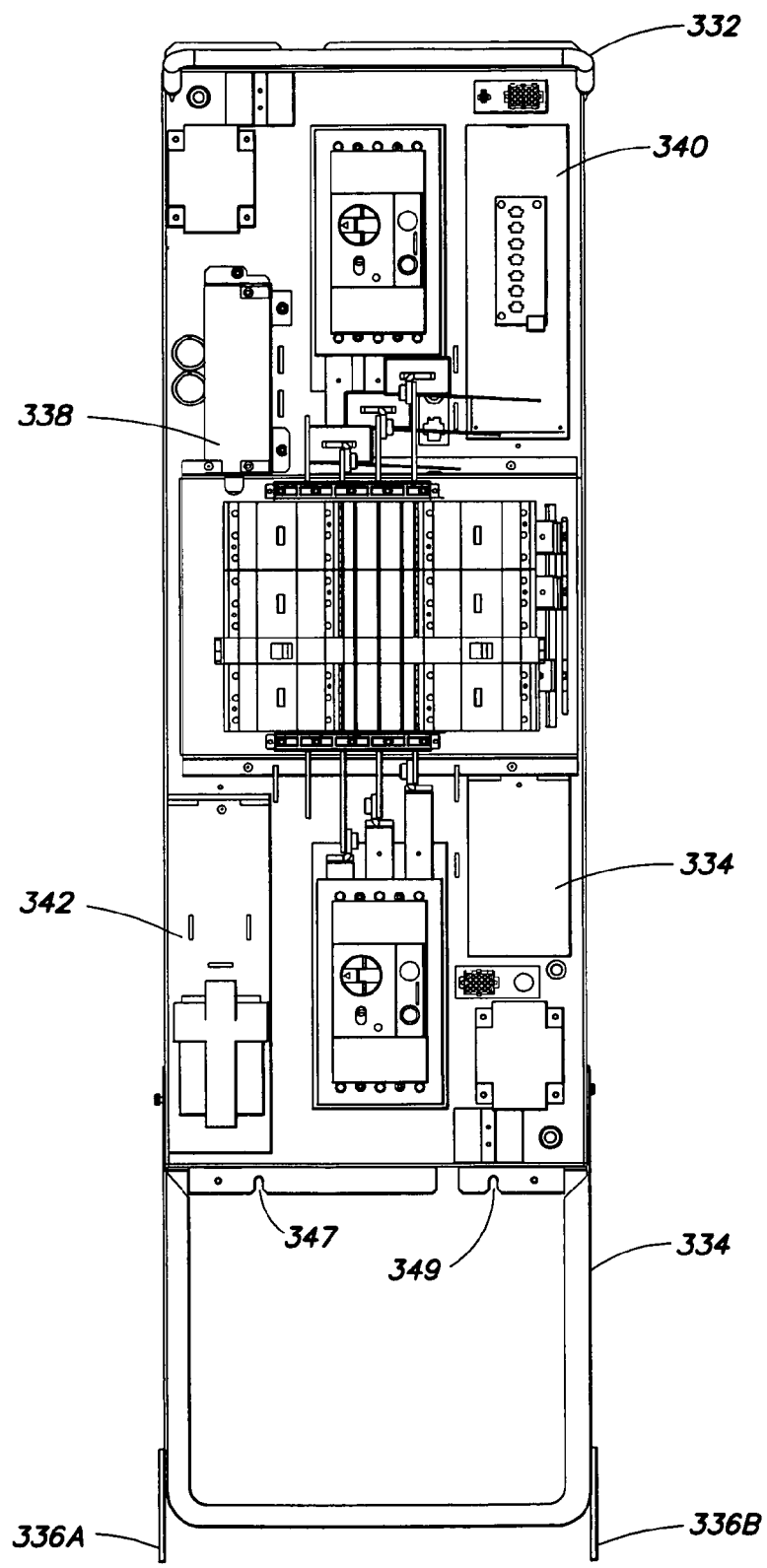

In another embodiment of the present invention, which will now be described with reference to FIGS. 7–9, components of the system 100 described above are installed in an enclosure 300 used in place of the enclosure 200. Enclosure 300 is similar to enclosure 200 and includes a front door 302, an inner door 304, and an interior area 308. The display 108 of the system 100 is mounted to the inner door and is accessible through a window 310 in the front door 302. The enclosure 300 includes a transformer 313 that may be used in a 480 volt system to generate 120 volts to supply power to a generator heater and battery charger.

In the enclosure 300 components of the system 100, other than the display are mounted to a removable panel 330. The components attached to the panel include the controller 102, the transfer switches 180A and 180B, the distribution circuit breakers 214A–214F, and bus bars 220A, 220B, 220C. The controller is mounted behind a cover 338, and the sensors 112, 114 and 116 are mounted behind covers 340, 342 and 344. Two transformers 331 and 333 are mounted to the panel 330. In one embodiment, the transformers are used to provide 120 volts for operation of the controller from either the utility line or from a generator. In different embodiments, the panel may contain less than all of the components of the system 100.

Also attached to the removable panel 330 is a handle 332, and a lower bracket 334 having wheels 336A and 336B. As demonstrated in FIGS. 7 and 8, the handle and the wheels are arranged such that the panel 300 can be easily wheeled in an out of the enclosure 300, and is designed to allow one installer to remove and install the panel. In one embodiment, the handle and the wheels are removable and may be removed from the enclosure once the panel has been mounted to the enclosure, however, in other embodiments, the handle and the wheels may be permanently fixed to the panel 300.

The removable panel 300 is designed to either be shipped with the enclosure 300 or alternatively, may be shipped separate from the panel and installed in the enclosure on site. In either case, the ease by which the panel 300 may be removed simplifies installation of power cables and data cables in the enclosure. When the enclosure is to be installed, the panel 300 may be removed, power and data cables may be wired into the enclosure 200, the panel may be mounted, and data and power cables may then be coupled to the panel. In embodiments of the invention, the ability to remove the panel during installation of large power cables results in a safer, faster and simpler installation of the power cables, and prevents damage to components that could result from accidental shorting of components due to dropped hardware and tools during installation.

In one embodiment, the panel is installed to the enclosure using four studs that are mounted to the rear of the enclosure 300 and pass through mounting holes in the panel. One of the studs, 339 is visible in FIG. 8. Two upper studs pass through two top mounting holes 343 and 345 (see FIG. 9A) of the panel and two lower studs pass though slots 347 and 349 on the panel. The panel is secured to the studs using standard hex nuts. When the enclosure is to be removed, the data and power cables are disconnected and the four hex nuts are removed. The handle can then be used to tilt the panel 300 away from the back wall, and the panel can then be moved like a standard two-wheeler dolly. The use of the slots 347 and 349 cause the panel to be properly aligned in the enclosure 300.

At least one system of the invention offers the benefit of providing a scalable solution to integrating backup power into a facility. In particular, when an additional generator is needed to meet increased power demands, multiple systems, like system 100, may be installed to meet the increased demand.

In embodiments of the present invention, an interlock scheme is implemented using motor controlled switches. As understood by those skilled in the art, in other embodiments, other types of controlled switches may be used to implement the interlock scheme described.

Embodiments of the invention overcome at least one drawback of prior art systems. At least one embodiment reduces engineering field time, increases reliability and improves lead time by providing a factory built package that provides for integration of a generator into a facility power distribution system.

In embodiments of the invention discussed above, a generator is used to provide backup power. In other embodiments, other backup power sources such as batteries and fuel cells may also be used. In addition, embodiments of the invention may be used with two different utility sources of power, or with two generators.

An advantage of at least one embodiment of the invention is that the size of a generator used may be less than in prior solutions to better match the load. The use of a UPS with a gradual ramp up from battery to utility combined with A/C units having dual scroll compressors, and staged operation presents a lower starting current draw on the generator, allowing the generator to be sized much closer to the operating current draw versus the traditionally much higher starting current draw.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A power distribution system for distributing power from a primary power source and a backup power source to a load, the power distribution system comprising:
   a first input to receive input power from the primary power source;
   a second input to receive input power from the backup power source;
   an output that provides output power from at least one of the primary power source and the backup power source;
   a first switch operatively coupled to the first input and the output and operative to selectively couple the first input to the output;
   a second switch operatively coupled to the second input and the output and operative to selectively couple the second input to the output; and
   a controller operatively coupled to the first switch and to the second switch and configured to control the first switch and the second switch to provide an electrical interlock;
   wherein each of the first switch and the second switch is a multi-mode switch having at least three operational states, and wherein the controller is configured to control switching of the first switch and the second switch between the at least three operational states.

2. The power distribution system of claim 1, wherein each of the first switch and the second switch has an open position and a closed position, and wherein the controller is configured to control the first switch in at least one mode of operation to switch from the closed position to the open position, if the second switch is switched from the open position to the closed position.

3. The power distribution system of claim 1, further comprising an input to receive an emergency power off signal, and wherein the controller is configured to switch both the first switch and the second switch to an open position upon receipt of the emergency power off signal.

4. The power distribution system of claim 1, wherein the backup power source is a generator, wherein the power distribution system is configured to receive a DC voltage from a battery of the generator, and wherein power for the controller is derived from the DC voltage from the battery.

5. The power distribution system of claim 1, wherein the controller is configured to receive data related to operational status of the generator and to control the first switch and the second switch based on the data.

6. The power distribution system of claim 5, wherein the data related to operational status of the generator includes a fuel level of the generator, and wherein the controller is configured to determine a run time of the generator based on the fuel level.

7. The power distribution system of claim 1, wherein the controller is configured to receive UPS data related to operational status of at least one uninterruptible power supply and to control the first switch and the second switch based on the UPS data.

8. The power distribution system of claim 1, wherein the backup power source is a generator, and wherein the output is configured to provide power to the generator.

9. The power distribution system of claim 1, wherein the at least three operational states include an open state, a closed state and a shunt trip state.

10. The power distributions system of claim 1, wherein the first switch includes a first motor operable under control of the controller to change states of the first switch, and wherein the second switch includes a second motor operable under control of the controller to change states of the second switch.

11. A power distribution system for distributing power from a primary power source and a backup power source to a load, the power distribution system comprising:
 a first input to receive input power from the primary power source;
 a second input to receive input power from the backup power source;
 an output that provides output power from at least one of the primary power source and the backup power source;
 a first switch operatively coupled to the first input and the output and operative to selectively couple the first input to the output;
 a second switch operatively coupled to the second input and the output and operative to selectively couple the second input to the output; and
 a controller operatively coupled to the first switch and to the second switch and configured to control the first switch and the second switch to provide an electrical interlock;
 wherein each of the first switch and the second switch has an open position and a closed position, and wherein the controller is configured to control the first switch to switch from the closed position to the open position a predetermined period of time greater than zero after the second switch is switched from the open position to the closed position.

12. A power distribution system for distributing power from a primary power source and a backup power source to a load, the power distribution system comprising:
 a first input to receive input power from the primary power source;
 a second input to receive input power from the backup power source;
 an output that provides output power from at least one of the primary power source and the backup power source;
 a first switch operatively coupled to the first input and the output and operative to selectively couple the first input to the output;
 a second switch operatively coupled to the second input and the output and operative to selectively couple the second input to the output; and
 a controller operatively coupled to the first switch and to the second switch and configured to control the first switch and the second switch to provide an electrical interlock;
 wherein the primary power source provides voltage having a voltage waveform with a first voltage level and a first frequency, and the backup power source provides voltage having a voltage waveform with a second voltage level and a second frequency, wherein the second frequency is different from the first frequency, and wherein the controller is configured to change a source of output power for the power distribution system when the first voltage level is approximately equal to the second voltage level.

13. The power distribution system of claim 12, wherein the controller is configured to change the source of output power for the system when both the first voltage level and the second voltage level are approximately zero.

14. A power distribution system for distributing power from a primary power source and a backup power source to a load, the power distribution system comprising:
 an enclosure having at least one input to receive input power from a primary source and to receive input power from a backup source, and at least one output to provide output power;
 a first controlled switch mounted in the enclosure and configured to receive power from the primary source;
 a second controlled switch mounted in the enclosure and configured to receive power from the secondary source; and
 a controller mounted in the enclosure and coupled to the first controlled switch and the second controlled switch to provide power to the output from at least one of the first controlled switch and the second controlled switch;
 wherein each of the first switch and the second switch is a multi-mode switch having at least three operational states, and wherein the controller is configured to control switching of the first switch and the second switch between the at least three operational states.

15. The power distribution system of claim 14, further comprising a plurality of circuit breakers mounted in the enclosure and operatively coupled between the first controlled switch and the second controlled switch and the at least one output.

16. The power distribution system of claim 15, wherein the controller is configured to control the first switch and the second switch to provide an electrical interlock.

17. The power distribution system of claim 15, further comprising a plurality of bus bars bolted to each of the first controlled switch the second controlled switch and at least some of the plurality of circuit breakers.

18. The power distribution system of claim 14, further comprising a user interface device coupled to the controller.

19. The power distribution system of claim 18, wherein the enclosure includes a front door and wherein the user interface device is mounted in the enclosure and accessible through an opening in the front door of the enclosure.

20. The power distribution system of claim 19, wherein the enclosure includes an inner panel, accessible with the front door in an open position, having at least one opening to allow access to the first controlled switch and the second controlled switch.

21. The power distribution system of claim 20, wherein the user interface device is mounted to the inner panel.

22. The power distribution system of claim 14, wherein the enclosure has an input to receive a DC voltage from a generator, and wherein the controller is configured to be powered from the DC voltage.

23. The power distribution system of claim 14, further comprising a removable panel coupled to the enclosure; wherein the first controlled switch and the second controlled switch are mounted to the panel.

24. The power distribution system of claim 14, wherein the at least three operational states include an open state, a closed state and a shunt trip state.

25. The power distribution system of claim 14, wherein the first controlled switch includes a first motor operable under control of the controller to change states of the first controlled switch, and wherein the second controlled switch includes a second motor operable under control of the controller to change states of the second controlled switch.

26. A power distribution system for distributing power from a primary power source and a backup power source to a load, the power distribution system comprising:
   a first input to receive input power from the primary power source;
   a second input to receive input power from the backup power source;
   an output that provides output power from at least one of the primary power source and the backup power source;
   a first switch operatively coupled to the first input and the output and operative to selectively couple the first input to the output;
   a second switch operatively coupled to the second input and the output and operative to selectively couple the second input to the output;
   a controller operatively coupled to the first switch and to the second switch and configured to control the first switch and the second switch to provide an electrical interlock; and
   a removable panel coupled to the enclosure; wherein the first controlled switch and the second controlled switch are mounted to the panel;
   wherein the removable panel has a handle mounted to a top section of the removable panel, and a pair of wheels mounted to a bottom section of the removable panel.

27. A method for distributing power from a utility power source and a generator to a load, the method including:
   receiving input power at a first switch from the utility power source;
   providing power to the load from the first switch;
   receiving input power at a second switch from the generator;
   controlling the first switch and the second switch to implement an interlock scheme to limit the application of power at the load from both the utility power source and the generator; wherein each of the first switch and the second switch are operable between three positions and wherein controlling includes controlling each of the first switch and the second switch to operate in one of the three positions.

28. The method of claim 27, further comprising controlling the first switch in one mode of operation to switch from a closed position to an open position, if the second switch is switched from an open position to a closed position.

29. The method of claim 27, further comprising receiving an emergency power off signal, and switching both the first switch and the second switch to an open position upon receipt of the emergency power off signal.

30. The method of claim 27, further comprising receiving a DC voltage from a battery of the generator, and powering a controller for the first switch and the second switch from the DC voltage from the battery.

31. The method of claim 27, further comprising receiving data related to operational status of the generator and controlling the first switch and the second switch based on the data.

32. The method of claim 31, wherein the data related to operational status of the generator includes a fuel level of the generator, and wherein the method further includes determining a run time of the generator based on the fuel level.

33. The method of claim 27, further comprising receiving UPS data related to operational status of at least one uninterruptible power supply and controlling the first switch and the second switch based on the UPS data.

34. The method of claim 27, further comprising providing power to charge a battery of the generator from an output of one of the first switch and the second switch.

35. The method of claim 27, wherein controlling the first switch and the second switch includes controlling a first motor coupled to the first switch and controlling a second motor coupled to the second switch.

36. A method for distributing power from a utility power source and a generator to a load, the method comprising:
   receiving input power at a first switch from the utility power source;
   providing power to the load from the first switch;
   receiving input power at a second switch from the generator;
   controlling the first switch and the second switch to implement an interlock scheme to limit the application of power at the load from both the utility power source and the generator; and
   controlling the first switch to switch from a closed position to an open position a predetermined period of time greater than zero after the second switch is switched from an open position to a closed position.

37. A method for distributing power from a utility power source and a generator to a load, the method comprising:
   receiving input power at a first switch from the utility power source; providing power to the load from the first switch;
   receiving input power at a second switch from the generator; and
   controlling the first switch and the second switch to implement an interlock scheme to limit the application of power at the load from both the utility power source and the generator;
   wherein the utility power source provides voltage having a voltage waveform with a first voltage level and a first frequency, and the generator provides voltage having a voltage waveform with a second voltage level and a second frequency, wherein the second frequency is different from the first frequency, and wherein the method further comprises changing a source of output power for the load when the first voltage level is approximately equal to the second voltage level.

38. The method of claim 37, further comprising changing the source of output power for the load when both the first voltage level and the second voltage level are approximately zero.

39. A system for distributing power from a utility power source and a generator to a load, the system including:
   a first switch to receive power from the utility power source and selectively provide the received power to the load, the first switch having three operating positions;
   a second switch to receive power from the generator and selectively provide the received power to the load, the second switch having three operating positions;
   means for controlling the first switch and the second switch to operate in one of the three operating positions to implement an interlock scheme to limit the application of power at the load from both the utility power source and the generator.

40. The system of claim 39, further comprising means for controlling the first switch to switch in one mode of operation from a closed position to an open position, if the second switch is switched from an open position to a closed position.

41. The system of claim 39, further comprising means for receiving an emergency power off signal and for switching both the first switch and the second switch to an open position upon receipt of the emergency power off signal.

42. The system of claim 39, further comprising means for receiving a DC voltage from a battery of the generator and for powering a controller for the first switch and the second switch from the DC voltage from the battery.

43. The system of claim 39, further comprising means for receiving data related to operational status of the generator and for controlling the first switch and the second switch based on the data.

44. The system of claim 43, wherein the data related to operational status of the generator includes a fuel level of the generator, and wherein the system further includes means for determining a run time of the generator based on the fuel level.

45. The system of claim 39, further comprising means for receiving UPS data related to operational status of at least one uninterruptible power supply and for controlling the first switch and the second switch based on the UPS data.

46. The system of claim 39, further comprising means for providing power to charge a battery of the generator from an output of one of the first switch and the second switch.

47. A system for distributing power from a utility power source and a generator to a load, the system comprising:
   a first switch to receive power from the utility power source and selectively provide the received power to the load;
   a second switch to receive power from the generator and selectively provide the received power to the load;
   means for controlling the first switch and the second switch to implement an interlock scheme to limit the application of power at the load from both the utility power source and the generator; and
   means for controlling the first switch to switch from a closed position to an open position a predetermined period of time greater than zero after the second switch is switched from an open position to a closed position.

48. A system for distributing power from a utility power source and a generator to a load, the system comprising:
   a first switch to receive power from the utility power source and selectively provide the received power to the load;
   a second switch to receive power from the generator and selectively provide the received power to the load; and
   means for controlling the first switch and the second switch to implement an interlock scheme to limit the application of power at the load from both the utility power source and the generator;
   wherein the utility power source provides voltage having a voltage waveform with a first voltage level and a first frequency, and the generator provides voltage having a voltage waveform with a second voltage level and a second frequency, wherein the second frequency is different from the first frequency, and wherein the system further comprises means for changing a source of output power for the load when the first voltage level is approximately equal to the second voltage level.

49. The system of claim 48, further comprising means for changing the source of output power for the load when both the first voltage level and the second voltage level are approximately zero.

* * * * *

UNITED STATES PATENT AND TRADEMARK OFFICE
CERTIFICATE OF CORRECTION

PATENT NO. : 7,142,950 B2  Page 1 of 1
APPLICATION NO. : 10/856741
DATED : November 28, 2006
INVENTOR(S) : Neil Rasmussen et al.

It is certified that error appears in the above-identified patent and that said Letters Patent is hereby corrected as shown below:

In the Claims:

Column 25, line 18, claim 5, delete "1" replace with --4--.

Signed and Sealed this

Twenty-fifth Day of December, 2007

JON W. DUDAS
*Director of the United States Patent and Trademark Office*